(12) United States Patent
Hatta (10) Patent No.: US 10,247,603 B2
(45) Date of Patent: Apr. 2, 2019

(54) ULTRAVIOLET-SENSITIVE SHEET, ULTRAVIOLET-SENSING KIT, AND METHOD FOR SENSING ULTRAVIOLET

(71) Applicant: FUJIFILM Corporation, Tokyo (JP)

(72) Inventor: Masahiro Hatta, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 308 days.

(21) Appl. No.: 14/829,940

(22) Filed: Aug. 19, 2015

(65) Prior Publication Data

US 2015/0355020 A1   Dec. 10, 2015

Related U.S. Application Data

(63) Continuation of application No. PCT/JP2014/054267, filed on Feb. 24, 2014.

(30) Foreign Application Priority Data

Feb. 25, 2013   (JP) ................. 2013-035047

(51) Int. Cl.
*G01J 1/50* (2006.01)
*G01J 1/04* (2006.01)
*G01J 1/42* (2006.01)

(52) U.S. Cl.
CPC ............. *G01J 1/50* (2013.01); *G01J 1/0407* (2013.01); *G01J 1/429* (2013.01)

(58) Field of Classification Search
CPC .................. G01J 1/50; G01J 1/04; G01J 1/42
See application file for complete search history.

(56) References Cited

U.S. PATENT DOCUMENTS 3,902,903 A * 9/1975 Itano ............... G03C 1/675
                                               430/351
4,829,187 A   5/1989 Tomita et al.
(Continued)

FOREIGN PATENT DOCUMENTS

EP   1 997 428 A1   12/2008
JP   62-112020 A    5/1987
(Continued)

OTHER PUBLICATIONS

Office Action dated Apr. 5, 2016 from the Japanese Patent Office in Japanese Application No. 2014-032536.
(Continued)

*Primary Examiner* — David Porta
*Assistant Examiner* — Djura Malevic
(74) *Attorney, Agent, or Firm* — Sughrue Mion, PLLC (57) ABSTRACT

Provided an ultraviolet-sensing sheet that facilitates measurement of ultraviolet irradiance over a wide area, that is suitable in ultraviolet irradiance in a range from 1 to 1,000 mJ/cm$^2$, and that is easier to visually assess for coloring on the cumulative illuminance of ultraviolet, an ultraviolet-sensing kit, and a method for sensing ultraviolet.

The ultraviolet-sensing kit comprises a sheet containing an ultraviolet-sensing layer and a film for adjusting ultraviolet-sensitivity, wherein the sheet containing an ultraviolet-sensing layer comprising, a support and an ultraviolet-sensing layer in this order, the ultraviolet-sensing layer comprising a capsule containing a photo-oxidant and a capable of developing color by the photo-oxidant, a mass ratio of the photo-oxidant and the leuco dye is 0.2 to 1.0:1, and the leuco dye being present in an amount of 0.1 to 1.0 g per 1 m$^2$ of a surface area of the ultraviolet-sensing layer.

21 Claims, 2 Drawing Sheets

(56) References Cited

U.S. PATENT DOCUMENTS

| | | | | |
|---|---|---|---|---|
| 4,962,009 | A | | 10/1990 | Washizu et al. |
| 5,093,511 | A | * | 3/1992 | Yoshida ................ A61K 8/585 424/60 |
| 5,206,118 | A | * | 4/1993 | Sidney ...................... G01T 1/04 250/474.1 |
| 5,244,769 | A | * | 9/1993 | Yanagihara ............ G03C 1/732 430/138 |
| 5,315,022 | A | * | 5/1994 | Yoshida ................ A61K 8/585 556/437 |
| 5,387,798 | A | * | 2/1995 | Funakoshi ............... C09K 9/02 250/474.1 |
| 5,475,126 | A | * | 12/1995 | Yoshida ................ A61K 8/585 424/401 |
| 5,516,620 | A | * | 5/1996 | Cheng ..................... G03F 7/002 430/138 |
| 5,612,541 | A | * | 3/1997 | Hoffmann ................ G01J 1/50 250/474.1 |
| 5,955,224 | A | * | 9/1999 | Caspar ................... B41M 5/465 430/17 |
| 6,251,571 | B1 | * | 6/2001 | Dessauer ............ B41M 5/3375 430/332 |
| 6,387,584 | B1 | * | 5/2002 | Ikeda ..................... G03C 1/002 430/138 |
| 7,144,676 | B2 | * | 12/2006 | Barr ........................ G03C 1/73 430/270.1 |
| 8,403,558 | B2 | * | 3/2013 | Fuchs .................. C08K 5/3417 116/207 |
| 9,645,552 | B2 | * | 5/2017 | Cincotta .................... G04F 1/02 |
| 2005/0018595 | A1 | * | 1/2005 | Conroy .................. B41M 3/003 369/288 |
| 2010/0329950 | A1 | * | 12/2010 | Faran ........................ G01J 1/50 422/400 |
| 2013/0239874 | A1 | * | 9/2013 | Smith .................. G01N 31/229 116/206 |
| 2014/0044609 | A1 | * | 2/2014 | Prusik .................... G01K 11/12 422/429 |
| 2015/0355020 | A1 | * | 12/2015 | Hatta ....................... G01J 1/429 250/473.1 |
| 2015/0355021 | A1 | * | 12/2015 | Hatta ....................... G01J 1/429 250/473.1 |
| 2017/0089760 | A1 | * | 3/2017 | Hatta ....................... G01J 1/429 |

FOREIGN PATENT DOCUMENTS

| | | | |
|---|---|---|---|
| JP | 63-305189 | A | 12/1988 |
| JP | H 1-207741 | A | 8/1989 |
| JP | 01-272930 | A | 10/1989 |
| JP | 02-000044 | A | 1/1990 |
| JP | 3-19536 | B2 | 3/1991 |
| JP | 09-126887 | A | 5/1997 |
| JP | 10-122958 | A | 5/1998 |
| JP | 10-288552 | A | 10/1998 |
| JP | 2001-147154 | A | 5/2001 |
| JP | 2009-543057 | A | 12/2009 |
| WO | 2007/108322 | A1 | 9/2007 |
| WO | 2007/108332 | A1 | 9/2007 |
| WO | 2008/002743 | A1 | 1/2008 |

OTHER PUBLICATIONS

Shigemitsu Morita, "Development of microcapsule UV actinometer", Journal of Azabu University, vol. 13, No. 14, Mar. 31, 2007, pp. 229-235.

International Search Report of PCT/JP2014/054420 dated May 27, 2014 [PCT/ISA/210].

Written Opinion of PCT/JP2014/054420 dated May 27, 2014 [PCT/ISA/237].

International Search Report of PCT/JP2014/054267 dated May 13, 2014[PCT/ISA/210].

Written Opinion of PCT/JP2014/054267 dated May 13, 2014[PCT/ISA/237].

Office Action dated Apr. 5, 2016 from the Japanese Patent Office in counterpart Japanese Application No. 2013-035047.

Office Action dated May 20, 2016, from the State Intellectual Property Office of People's Republic of China in counterpart Chinese Application No. 201480009998.X.

International Preliminary Report on Patentability dated Sep. 3, 2015 issued by the International Bureau in International Application No. PCT/JP2014/054420.

International Preliminary Report on Patentability dated Sep. 3, 2015 issued in counterpart International Application No. PCT/JP2014/054267.

Office Action dated Jun. 7, 2016, from the Japanese Patent Office in Japanese Application No. 2014-032536.

Office Action dated Jul. 18, 2016 from the State Intellectual Property Office of the P.R.C. in counterpart Chinese Application No. 201480009635.6.

Office Action dated Aug. 11, 2016 in co-pending U.S. Appl. No. 14/829,964.

Office Action dated Nov. 29, 2016 from the Japanese Patent Office in counterpart Japanese Application No. 2013-035047.

Office Action dated Feb. 7, 2017, from the Japanese Patent Office in Japanese Application No. 2014-032536.

Office Action dated Mar. 3, 2017, from the State Intellectual Property Office of the P.R.C., in Chinese Application No. 201480009635.6.

Office Action dated Apr. 3, 2018 from the Japanese Patent Office in Japanese Application No. 2017-092429.

U.S. Appl. No. 14/829,964, filed Aug. 19, 2015, FUJIFILM Corporation.

Office Action dated Mar. 30, 2018 from the U.S. Patent and Trademark Office in U.S. Appl. No. 15/378,215.

Notice of Allowance dated Sep. 24, 2018 from the U.S. Patent and Trademark Office in U.S. Appl. No. 15/378,215.

Office Action dated Nov. 13, 2018, from State Intellectual Property Office of the P.R.C. in Chinese Application No. 201611135776.X.

* cited by examiner

ULTRAVIOLET-SENSITIVE SHEET, ULTRAVIOLET-SENSING KIT, AND METHOD FOR SENSING ULTRAVIOLET

CROSS-REFERENCE TO RELATED APPLICATIONS

This application is a Continuation of PCT International Application No. PCT/JP2014/054267 filed on Feb. 24, 2014, which claims priority under 35 U.S.C § 119(a) to Japanese Patent Application No. 2013-035047 filed on Feb. 25, 2013. The above application is hereby expressly incorporated by reference, in its entirety, into the present application.

TECHNICAL FIELD

The present invention relates to ultraviolet-sensing sheets, ultraviolet-sensing kits, and methods for sensing ultraviolet.

BACKGROUND ART

A measurement of an ultraviolet dose is used in various fields, for example, ultraviolet dosimeters are used to measure the ultraviolet dose of an object irradiated with ultraviolet radiation from an ultraviolet irradiation system for curing ultraviolet-curable resins.

Commonly known ultraviolet dosimeters are semiconductor photovoltaic devices, which are expensive and not readily portable. Simpler and inexpensive known tools are photochromic cards, which change color reversibly in response to ultraviolet. Although photochromic cards can be used to determine the ultraviolet intensity during irradiation, the cumulative illuimance of ultraviolet cannot be determined.

For example, Patent document 1 proposes a method for measuring cumulative irradiance with allochroic materials. Unfortunately, this method is not suitable for quantitative determination because of insufficient sensitivity.

Also proposed are a method for quantitatively determining ultraviolet dose using photosensitive paper (see Patent document 2) and a method utilizing oxidative coloration of leuco dyes (see Patent document 3). Unfortunately, these methods are intended for recording and are not suitable for measurement of ultraviolet irradiance over a wide range. These methods are also not suitable for measurement of ultraviolet irradiance in a range from 100 to 1,000 $mJ/cm^2$, which is most widely used in manufacturing processes involving the use of ultraviolet curing.

CITATION LIST

Patent Literature

Patent document 1: Japanese Unexamined Patent Application Publication No. 10-288552
Patent document 2: Japanese Unexamined Patent Application Publication No. 10-122958
Patent document 3: Japanese Unexamined Patent Application Publication No. 62-112020

SUMMARY OF INVENTION

Technical Problem

Even if an ultraviolet-sensing sheet or film facilitates measurement of cumulative illuminance of ultraviolet over a wide area and makes possible to continuously develop color depending on the cumulative illuminance of ultraviolet in a range from 1 to 1,000 $mJ/cm^2$, the ultraviolet-sensing sheet or film may be unsuitable for visual observation because of excess color density, depending on the type of dye. In view of the foregoing disadvantages, an object of the present invention is to provide an ultraviolet-sensing sheet or film that can continuously develop color, depending on the cumulative illuminance of ultraviolet and that is easier to visually assess for color development depending on the cumulative illuminance of ultraviolet.

Solution to Problem

The inventors have conducted intensive research under the foregoing circumstances. As a result, the inventor has developed an ultraviolet-sensing layer, provided on a support, that contains capsules containing a photo-oxidant and a leuco dye in a mass ratio of 0.2 to 1.0:1. The photo-oxidant generates radicals in an amount in proportion to an increase in ultraviolet dose so as to sense ultraviolet radiation with high gradation property. The inventor has also discovered that the ultraviolet irradiance that contributes to color development can be adjusted using a layer for adjusting ultraviolet-sensitivity or film for adjusting ultraviolet-sensitivity to give a color that is easier to visually determine, and thereby have completed the present invention.

Means for solving the problem is a means below <1>, preferably, it is a means of following <2> to <18>.

<1> An ultraviolet-sensing kit comprising a sheet containing an ultraviolet-sensing layer and a film for adjusting ultraviolet-sensitivity,
wherein the sheet containing an ultraviolet-sensing layer comprising a support and an ultraviolet-sensing layer in this order,
the ultraviolet-sensing layer comprising a capsule containing a photo-oxidant and a capable of developing color by the photo-oxidant,
a mass ratio of the photo-oxidant and the leuco dye is 0.2 to 1.0:1,
and the leuco dye being present in an amount of 0.1 to 1.0 g per 1 $m^2$ of a surface area of the ultraviolet-sensing layer.
<2> The ultraviolet-sensing kit according to <1>, wherein the film for adjusting ultraviolet-sensitivity has a transmittance at 300 nm of 10% or less and a transmittance at 450 nm of 70% or more.
<3> The ultraviolet-sensing kit according to <1> or <2>, wherein the film for adjusting ultraviolet-sensitivity comprises pigment particles.
<4> The ultraviolet-sensing kit according to <3>, wherein the pigment particles comprise titanium oxide.
<5> The ultraviolet-sensing kit according to <3> or <4>, wherein the pigment particles have an average particle size of 0.01 μm or more.
<6> The ultraviolet-sensing kit according to any one of <3> to <5>, wherein the pigment particles are present in an amount of 5 g or more per 1 $m^2$ of a surface area of the film for adjusting ultraviolet-sensitivity.
<7> The ultraviolet-sensing kit according to any one of <1> to <6>, wherein the film for adjusting ultraviolet-sensitivity comprises an ultraviolet absorber.
<8> The ultraviolet-sensing kit according to any one of <1> to <7>, wherein the photo-oxidant has a molar absorption coefficient ε of 2,000 or less at a wavelength of 350 nm and a molar absorption coefficient ε of 10,000 or more at a wavelength of 250 nm.
<9> The ultraviolet-sensing kit according to any one of <1> to <8>, wherein the capsule is a microcapsule.

<10> The ultraviolet-sensing kit according to any one of <1> to <9>, wherein the leuco dye is an aminoarylmethane.
<11> The ultraviolet-sensing kit according to any one of <1> to <10>, wherein the UV-sensing sheet has a cumulative illuminance of from 1 to 1,000 mJ/cm² as measured at a wavelength of 365 nm when the UV-sensing sheet is irradiated with a high-pressure mercury lamp.
<12> The ultraviolet-sensing kit according to any one of <1> to <11>, wherein the support is a plastic film.
<13> An ultraviolet-sensing sheet comprising, a support, an ultraviolet-sensing layer, and a layer for adjusting ultraviolet-sensitivity in this order,
wherein the ultraviolet-sensing layer comprises a capsule containing a photo-oxidant and a capable of developing color by the photo-oxidant,
a mass ratio of the photo-oxidant and the leuco dye is 0.2 to 1.0:1; and
the leuco dye is present in an amount of 0.1 to 1.0 g per 1 m² of a surface area of the ultraviolet-sensing layer.
<14> The ultraviolet-sensing sheet according to <13>, wherein the layer for adjusting ultraviolet-sensitivity has a transmittance at 300 nm of 10% or less and a transmittance at 450 nm of 70% or more.
<15> The ultraviolet-sensing sheet according to <13> or <14>, wherein the layer for adjusting ultraviolet-sensitivity comprises a pigment particle.
<16> The ultraviolet-sensing sheet according to any one of <13> to <15>, wherein the layer for adjusting ultraviolet-sensitivity comprises an ultraviolet absorber.
<17> The ultraviolet-sensing sheet according to any one of <13> to <16>, wherein the layer for adjusting ultraviolet-sensitivity is an outermost layer.
<18> A method for sensing ultraviolet using the ultraviolet-sensing sheet or ultraviolet-sensing kit according to any one of <1> to <17>.

Advantageous Effects of Invention

The present invention provides an ultraviolet-sensing sheet that facilitates ultraviolet irradiance over a wide area, that is effective in ultraviolet irradiance in a range from 1 to 1,000 mJ/cm², and that is easier to visually assess for color depending on the cumulative illuminance of ultraviolet.

DESCRIPTION OF EMBODIMENTS

The present invention will be explained in detail below. As used herein, each numerical range expressed by two values on both sides of "to" is used to mean the range including the values indicated before and after "to" as lower and upper limits.

<Ultraviolet-Sensing Sheet and Ultraviolet-Sensing Kit>
An ultraviolet-sensing sheet according to the present invention includes, in sequence, a support, an ultraviolet-sensing layer, and a layer for adjusting ultraviolet-sensitivity. The ultraviolet-sensing layer contains capsules containing a photo-oxidant and a chromogenic leuco dye reactive to the photo-oxidant in a mass ratio of 0.2 to 1.0:1. The leuco dye is present in an amount of 0.1 to 1.0 g per square meter of a surface area of the ultraviolet-sensing layer.

An ultraviolet-sensing kit according to the present invention includes a sheet containing an ultraviolet-sensing layer and a film for adjusting ultraviolet-sensitivity. The sheet containing an ultraviolet-sensing layer includes, in sequence, a support and an ultraviolet-sensing layer. The ultraviolet-sensing layer contains capsules containing a photo-oxidant and a chromogenic leuco dye reactive to the photo-oxidant in a mass ratio of 0.2 to 1.0:1. The leuco dye is present in an amount of 0.1 to 1.0 g per square meter of a surface area of the ultraviolet-sensing layer.

Figure 1:
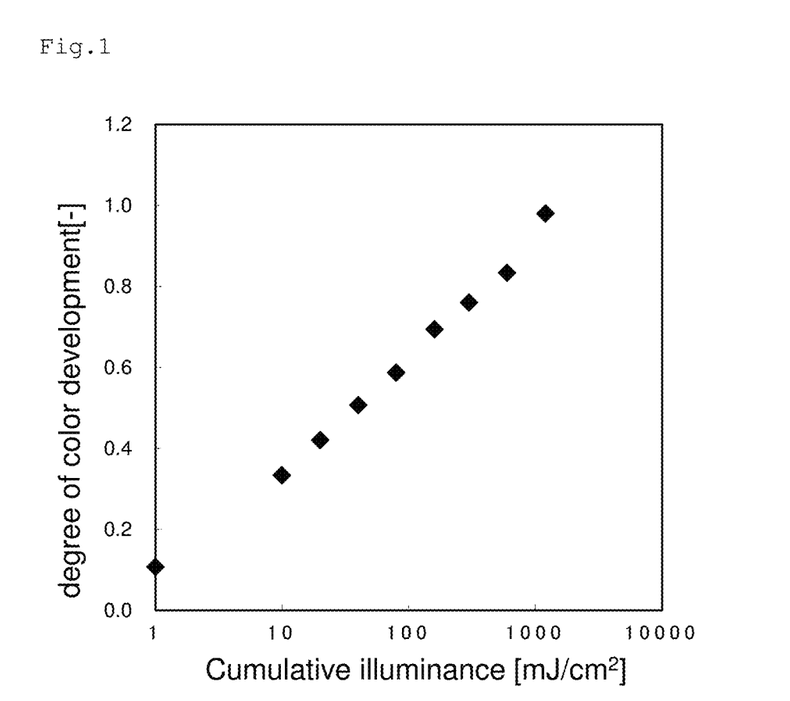
FIG. 1 is a graph showing the degree of developing color of the present invention.

An ultraviolet-sensing sheet or kit satisfying at least the above requirements can respond sensitively to ultraviolet and sense ultraviolet. In particular, when the ultraviolet-sensing sheet is irradiated with a high-pressure mercury lamp, the degree of color development of the ultraviolet-sensing sheet or kit according to the present invention vary depending on the irradiance measured at a wavelength of 365 nm, and thus can effectively determine the ultraviolet irradiance. As used herein, the term "high-pressure mercury lamp" refers to, for example, a high-pressure ultraviolet lamp available from Ushio Inc. FIG. 1 is a graph showing the degree of color development of the ultraviolet-sensing sheet or kit according to the present invention, where the vertical axis is a logarithmic of the degree of color development, and the horizontal axis is a cumulative illuminance of ultraviolet. FIG. 1 demonstrates that the ultraviolet-sensing sheet or kit according to the present invention can effectively sense ultraviolet radiation depending on the ultraviolet irradiance in a range of cumulative illuminance of ultraviolet of 1 to 1,000 mJ/cm². In the present invention, the ultraviolet irradiance that contributes to color development can be adjusted using a layer for adjusting ultraviolet-sensitivity or film for adjusting ultraviolet-sensitivity (hereinafter also referred to as "layer for adjusting ultraviolet-sensitivity or film") to sense ultraviolet sensitively to the degree of color development to visually contact.

Light sources other than high-pressure mercury lamps can also be used in the present invention. Examples of other light sources include metal halide lamps, ultraviolet-LED lamps, low-pressure mercury lamps, and ultraviolet lasers.

The ultraviolet-sensing sheet and the sheet containing an ultraviolet-sensing layer according to the present invention preferably undergo a change in reflection density $\Delta D1$ of 0.2 or more, more preferably 0.25 or more, in a range of cumulative illuminance of 1 mJ/cm² or more and less than 10 mJ/cm², a change in reflection density $\Delta D2$ of 0.2 or more, more preferably 0.25 or more, in a range of cumulative illuminance of 10 mJ/cm² or more and less than 100 mJ/cm², and a change in reflection density $\Delta D3$ of 0.2 or more, more preferably 0.25 or more, in a range of cumulative illuminance of 100 mJ/cm² or more and 1,000 mJ/cm² or less, when measured at a wavelength of 365 nm. Preferably, the ultraviolet-sensing sheet and the sheet containing an ultraviolet-sensing layer according to the present invention undergo a change in reflection density of 0.4 or less, although no critical upper limit is defined. The ultraviolet-sensing sheet and the sheet containing an ultraviolet-sensing layer according to the present invention preferably exhibit particular reflection densities at particular cumulative illuminance. For example, the ultraviolet-sensing sheet and the sheet containing an ultraviolet-sensing layer according to the present invention preferably exhibit a change in reflection density greater than 0.15 and 0.3 or less, more preferably 0.15 or less, as measured at a wavelength of 365 nm. At a cumulative illuminance of 10 mJ/cm$^2$, the change in reflection density is preferably greater than 0.10 and 0.15 or less, or greater than 0.3 and 0.4 or less, more preferably greater than 0.15 and 0.3 or less. At a cumulative illuminance of 100 mJ/cm$^2$, the change in reflection density is preferably greater than 0.2 and 0.3 or less, or greater than 0.6 and 0.8 or less, more preferably greater than 0.3 and 0.6 or less, at a cumulative illuminance of 1,000 mJ/cm$^2$.

The term "change in reflection density" refers to the color change after an irradiation illuminance with ultraviolet to before a predetermined cumulative illuminance; specifically, it can be measured with a reflection densitometer (X-Rite 310, X-Rite Inc.).

If the changes in reflection densities ΔD1 to ΔD3 fall within the above ranges, the ultraviolet-sensing sheet and the sheet containing an ultraviolet-sensing layer according to the present invention can continuously develop color depending on the cumulative ultraviolet illuminance, thereby sensitively sensing ultraviolet radiation.

The ultraviolet sensing mechanism according to the present invention will now be described with reference to FIGS. 2 and 3. It should be understood that the drawings are not intended to limit the present invention.

Figure 2:
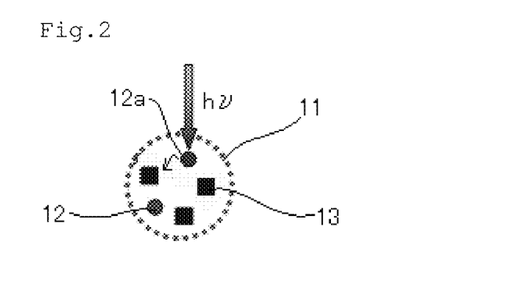
FIG. 2 is a schematic view of an example capsule for use in the present invention.
Figure 3:
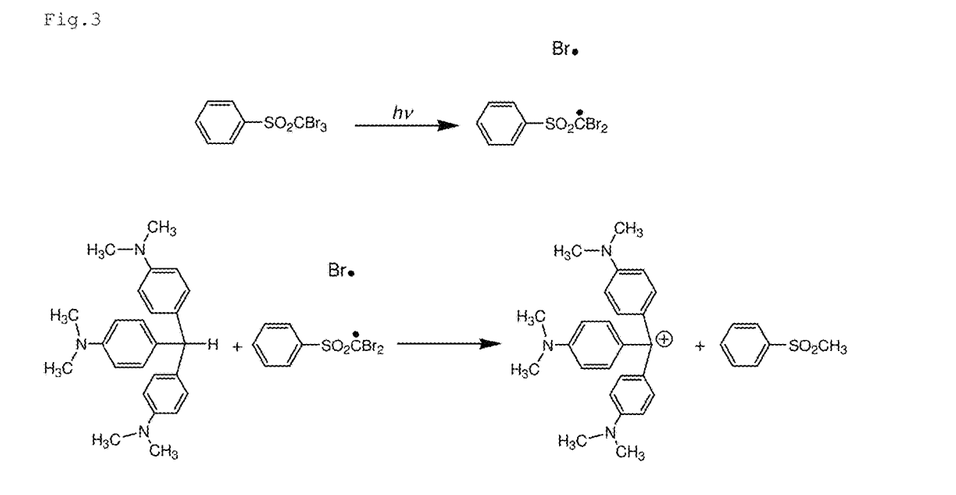
FIG. 3 illustrates an example reaction scheme of a photo-oxidant and a leuco dye.

FIG. 2 is a schematic view of an example capsule for use in the present invention. As shown in FIG. 2, the capsule 11 contains a photo-oxidant 12 and a leuco dye 13. FIG. 3 illustrates an example reaction scheme of the photo-oxidant and the leuco dye.

As shown in FIG. 2, upon ultraviolet irradiation, the photo-oxidant 12 in the capsule 11 absorbs ultraviolet radiation hv. The photo-oxidant 12 absorbed ultraviolet radiation hv is activated (an activated photo-oxidant 12a) to generate radicals (FIG. 3). As the ultraviolet dose increases, the photo-oxidant 12 generates a larger number of radicals, and accordingly, a larger amount of leuco dye 13 reacts with the resulting radicals.

Figure 4:
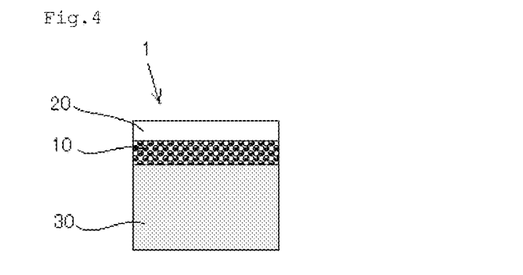
FIG. 4 is a schematic sectional view of an example ultraviolet-sensing sheet according to the present invention.
Figure 5:
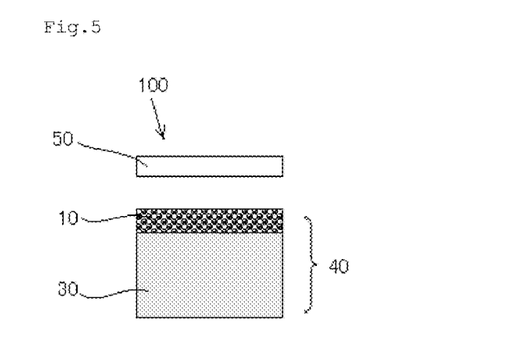
FIG. 5 is a schematic sectional view of an example ultraviolet-sensing kit according to the present invention.

The present invention provides an ultraviolet-sensing sheet including an ultraviolet-sensing layer and a layer for adjusting ultraviolet-sensitivity that are integrated together, for example, as illustrated in FIG. 4. The present invention also provides an ultraviolet-sensing kit including a film or the like including an ultraviolet-sensing layer and a separate film including a layer for adjusting ultraviolet-sensitivity, for example, as illustrated in FIG. 5. The details of the ultraviolet-sensing layer and the layer for adjusting ultraviolet-sensitivity are the same for both types. In the present invention, the layer for adjusting ultraviolet-sensitivity or the film for adjusting ultraviolet-sensitivity is used to adjust the ultraviolet irradiance of the ultraviolet-sensing layer. Specifically, in the present invention, the photo-oxidant contained in the ultraviolet-sensing layer generates a larger number of radicals in a proportion to the ultraviolet irradiance, thereby developing color of the dye. Therefore, when the ultraviolet irradiance which is irradiated to the ultraviolet-sensing layer is adjusted, the color development which continuously changes the color density depending on the ultraviolet irradiance can be adjusted so that the color is easier to visually determine.

The details will now be described.

<<<Structures of Ultraviolet-Sensing Sheet and Ultraviolet-Sensing Kit>>>

FIG. 4 is a schematic sectional view of an example ultraviolet-sensing sheet according to the present invention. The ultraviolet-sensing sheet 1 according to the present invention includes, this orderan ultraviolet-sensing layer 10, a support 30 supporting the ultraviolet-sensing layer 10, and a layer for adjusting ultraviolet-sensitivity 20. The layer for adjusting ultraviolet-sensitivity 20 is the outermost layer. As illustrated in FIG. 2, the ultraviolet-sensing layer 10 contains capsules dispersed therein, each containing a photo-oxidant and a leuco dye. A reflective layer (not shown) may be disposed between the support 30 and the ultraviolet-sensing layer 10 or on a surface of the support 30, the surface being away from the ultraviolet-sensing layer 10. The embodiment illustrated in FIG. 4 does not require a procedure for laminating the layer for adjusting ultraviolet-sensitivity 20.

FIG. 5 is a schematic sectional view of an example ultraviolet-sensing kit according to the present invention. The ultraviolet-sensing kit 100 includes a sheet containing an ultraviolet-sensing layer 40 including an ultraviolet-sensing layer 10 and a support 30 supporting the ultraviolet-sensing layer 10, and a film for adjusting ultraviolet-sensitivity 50. The ultraviolet-sensing layer 10 of the ultraviolet-sensing kit 100 is similar to the ultraviolet-sensing layer of the ultraviolet-sensing sheet according to the present invention. The support 30 is similar to the support 30 of the ultraviolet-sensing sheet according to the present invention. The film for adjusting ultraviolet-sensitivity 50 is similar to the layer for adjusting ultraviolet-sensitivity 20 of the ultraviolet-sensing sheet according to the present invention. In the embodiment illustrated in FIG. 5, as shown in FIG. 5, the ultraviolet-sensing sheet and the film for adjusting ultraviolet-sensitivity 50 are separately provided and are used together as a kit. This embodiment is advantageous in that the film for adjusting ultraviolet-sensitivity can be reused if a suitable material is selected for the film for adjusting ultraviolet-sensitivity 50.

The ultraviolet-sensing sheet according to the present invention may be a film having a thickness of 200 μm or less or may be a sheet having a thickness of more than 200 μm. For example, the ultraviolet-sensing sheet according to the present invention may have a thickness of 5 to 250 μm, more specifically, 25 to 150 μm. The ultraviolet-sensing sheet according to the present invention may also be a rolled film.

The individual layers will now be described.

<<<Ultraviolet-Sensing Layer>>>

The ultraviolet-sensing layer used in the present invention contains capsules containing a photo-oxidant and a leuco dye capable of development color by the photo-oxidant in a predetermined ratio. The leuco dye is present in the ultraviolet-sensing layer used in the present invention in an amount of 0.1 to 1.0 g, preferably 0.15 to 0.8 g, more preferably 0.2 to 0.5 g, per 1 m$^2$ of a surface area of the ultraviolet-sensing layer. By setting to be such a range, the photo-oxidant more effectively responds to the ultraviolet irradiance, to thereby more sensitively develop color. The capsules will be described in further detail later.

The ultraviolet-sensing layer typically contains a binder in which the capsules are dispersed and may optionally contain other additives. Examples of binders include emulsions of various polymers such as poly(vinyl alcohol), methyl cellulose, carboxymethyl cellulose, hydroxypropyl cellulose, gum arabic, gelatin, polyvinylpyrrolidone, casein, styrene-butadiene latex, acrylonitrile-butadiene latex, poly(vinyl acetate), polyacrylates, and ethylene-vinyl acetate copolymers. The binder is used in an amount of 0.1 to 5 g/m$^2$ on a solid basis.

In addition to the leuco dye and the photo-oxidant contained in the capsules, the ultraviolet-sensing layer may further contain other components such as sensitizers, reductants, antioxidants, and surfactants. Several additives such as sensitizers, reductants, and surfactants are disclosed in Japanese Unexamined Patent Application Publication No. 1-207741 at page 9, lower left column, to page 10, upper left column, and in Japanese Unexamined Patent Application Publication No. 2004-233614 at paragraphs 0038, 0039, and 0048 to 0059, the entire disclosures of which are incorporated herein by reference.

The ultraviolet-sensing layer may have any thickness, but preferably a thickness of 3 to 30 μm, more preferably 10 to 20 μm, even more preferably 12 to 17 μm.

[Capsules]

The capsules present in the ultraviolet-sensing layer used in the present invention contain the photo-oxidant and the leuco dye in a predetermined mass ratio. The photo-oxidant and the leuco dye are present in the capsules in a mass ratio of 0.2 to 1.0:1, preferably 0.3 to 0.8:1, more preferably 0.4 to 0.7:1. By adding to be such a mass ratio, the photo-oxidant more effectively responds to the ultraviolet irradiance, to thereby more sensitively develop color. Preferably, the average mass ratio of the photo-oxidant to the leuco dye in each capsule falls within the above ranges; however, the effect of the present invention are achieved if the average mass ratio of the photo-oxidant to the leuco dye per unit area of the ultraviolet-sensing layer falls within the above ranges.

The capsules used in the present invention prevent contact between the materials inside and outside the capsules at room temperature under the barrier function of the shell wall and exhibit increased material permeability only when heated to a certain temperature or higher.

The permeation onset temperature can be controlled by selecting a suitable combination of a shell wall material, a capsule core material, and additives. The permeation onset temperature corresponds to the glass transition temperature of the shell wall. Specific compositions are illustrated in Japanese Unexamined Patent Application Publication Nos. 59-190886, 59-190886, and 60-242094, the entire disclosures of which are incorporated herein by reference.

To control the glass transition temperature of the shell wall itself, the type of shell-wall forming agent must be changed. Examples of microcapsule shell wall materials usable in the present invention include polyurethanes, polyureas, polyesters, polycarbonates, urea-formaldehyde resins, melamine-formaldehyde resins, polystyrene, styrene-methacrylate copolymers, gelatin, polyvinylpyrrolidone, and poly(vinyl alcohol). These polymeric materials can be used in combination. In the present invention, preferred among the above polymeric materials are polyurethanes, polyureas, polyamides, polyesters, and polycarbonates, more preferably polyurethanes and polyureas.

The capsules used in the present invention are preferably formed by emulsifying a core material containing the reactants, such as the leuco dye and the photo-oxidant, and then encapsulating the oil droplets with walls of a polymeric material. The reactant that forms the polymeric material may be added inside and/or outside the oil droplets. Details of preferred capsules for use in the present invention, including preferred methods for manufacturing such capsules, are disclosed in the specifications of U.S. Pat. Nos. 3,726,804 and 3,796,696, the entire disclosures of which are incorporated herein by reference.

For example, if polyurethaneurea is used as the shell wall material, a polyisocyanate and a second material (e.g., a polyol) reactive therewith to form the shell wall are mixed in an aqueous phase or in the oily liquid to be encapsulated. The mixture is emulsified in water and is heated to induce a polymerization reaction at oil droplet interfaces, thereby forming a shell wall. Polyurea is formed, for example, if the second material is polyamine or if no material is added.

Polyisocyanates and polyols and polyamines reactive therewith (second materials) for use herein are disclosed in the specifications of U.S. Pat. Nos. 3,281,383, 3,773,695, and 3,793,268, Japanese Examined Patent Application Publication Nos. 48-40347, 49-24159, and 48-84086, and Japanese Unexamined Patent Application Publication No. 48-80191, the entire disclosures of which are incorporated herein by reference.

Examples of polyisocyanates include diisocyanates, such as m-phenylene diisocyanate, p-phenylene diisocyanate, 2,6-tolylene diisocyanate, 2,4-tolylene diisocyanate, naphthalene 1,4-diisocyanate, diphenylmethane 4,4-diisocyanate, 3,3'-dimethoxy-4,4'-biphenyl diisocyanate, 3,3'-dimethyldiphenylmethane 4,4'-diisocyanate, xylylene 1,4-diisocyanate, 4,4'-diphenylpropane diisocyanate, trimethylene diisocyanate, hexamethylene diisocyanate, propylene 1,2-diisocyanate, butylene 1,2-diisocyanate, cyclohexylene 1,2-diisocyanate, and cyclohexylene 1,4-diisocyanate; triisocyanates, such as 4,4',4'-triphenylmethane triisocyanate and toluene 2,4,6-triisocyanate; tetraisocyanates, such as 4,4'-dimethyldiphenylmethane 2,2',5,5'-tetraisocyanate; and isocyanate prepolymers, such as adducts of hexamethylene diisocyanate with trimethylolpropane, adducts of 2,4-tolylene diisocyanate with trimethylolpropane, adducts of xylylene diisocyanate with trimethylolpropane, and adducts of tolylene diisocyanate with hexanetriol. Examples of commercially available polyisocyanates include the TAKENATE series, such as TAKENATE D-110N (Mitsui Chemicals, Inc.).

Examples of polyols include aliphatic polyalcohols, aromatic polyalcohols, hydroxy polyesters, and hydroxy polyalkylene ethers.

Specific examples include polyols disclosed in Japanese Unexamined Patent Application Publication No. 60-49991, including ethylene glycol, 1,3-propanediol, 1,4-butanediol, 1,5-pentanediol, 1,6-hexanediol, 1,7-heptanediol, 1,8-octanediol, propylene glycol, 2,3-dihydroxybutane, 1,2-dihydroxybutane, 1,3-dihydroxybutane, 2,2-dimethyl-1,3-propanediol, 2,4-pentanediol, 2,5-hexanediol, 3-methyl-1,5-pentanediol, 1,4-cyclohexanedimethanol, dihydroxycyclohexane, diethylene glycol, 1,2,6-trihydroxyhexane, 2-phenylpropylene glycol, 1,1,1-trimethylolpropane, hexanetriol, pentaerythritol, pentaerythritol ethylene oxide adducts, glycerol ethylene oxide adducts, glycerol, 1,4-di(2-hydroxyethoxy)benzene, condensates of aromatic polyalcohols such as resorcinol dihydroxyethyl ether with alkylene oxides, p-xylylene glycol, m-xylylene glycol, α,α'-dihydroxy-p-diisopropylbenzene, 4,4'-dihydroxydiphenylmethane, 2-(p,p'-dihydroxydiphenylmethyl)benzyl alcohol, adducts of bisphenol A with ethylene oxide, and adducts of bisphenol A with propylene oxide. The polyol is preferably used in an amount of 0.02 to 2 mol of hydroxyl group per 1 mol of isocyanate group.

Examples of polyamines include ethylenediamine, trimethylenediamine, tetramethylenediamine, pentamethylenediamine, hexamethylenediamine, p-phenylenediamine, m-phenylenediamine, piperazine, 2-methylpiperazine, 2,5-dimethylpiperazine, 2-hydroxytrimethylenediamine, diethylenetriamine, triethylenetriamine, triethylenetetramine, diethylaminopropylamine, tetraethylenepentamine, and adducts of epoxy compounds with amines. Polyisocyanates can be reacted with water to form polymeric materials.

The organic solvent used to form oil droplets may be selected from common high-boiling oils, including phosphates, such as tricresyl phosphate; phthalates, such as dibutyl phthalate; acrylates; methacrylates; other carboxylates; fatty acid amides, such as N,N-diethyldodecanamide; alkylated biphenyls; alkylated terphenyls; chlorinated paraffin; alkylated naphthalenes; and diarylethanes. Specific examples include those disclosed in Japanese Unexamined Patent Application Publication Nos. 60-242094 and 63-045084, the entire disclosures of which are incorporated herein by reference.

In the present invention, the above organic solvents may be used in combination with cosolvents as low-boiling dissolution aids. Examples of such cosolvents include ethyl acetate, isopropyl acetate, butyl acetate, and methylene chloride.

The water-soluble polymer present as a protective colloid in the aqueous phase to be mixed with the oil phase may be selected from known anionic polymers, nonionic polymers, and amphoteric polymers, preferably from poly(vinyl alcohol), gelatin, and cellulose derivatives.

A surfactant may be incorporated into the aqueous phase. The surfactant incorporated into the aqueous phase may be selected from anionic and nonionic surfactants that do not react with the protective colloid to cause precipitation or aggregation.

Preferred examples of surfactants include sodium alkylbenzenesulfonates (e.g., sodium lauryl sulfate), dioctyl sodium sulfosuccinate, and poly(alkylene glycol)s (e.g., poly(oxyethylene nonylphenyl ether)).

The capsules used in the present invention are typically microcapsules having an average particle size of micrometer order. Preferably, the capsules have an average particle size of 0.1 to 100 µm, more preferably 0.3 to 10 µm, even more preferably 0.5 to 5 µm. Capsules having an average particle size of 0.1 µm or more can more stably protect the core material therein. Capsules having an average particle size of 100 µm or less provides a chromogenic material with a higher resolution.

[Leuco Dye]

The leuco dye used in the present invention can react with the photo-oxidant to give a color. The leuco dye is a reduced dye that has one or two hydrogen atoms and that loses or gains electrons to form a colored dye. Any leuco dye that is substantially colorless or slightly colored before losing electrons can be selected to achieve photo-oxidative coloration. A single leuco dye or a mixture of leuco dyes may be used.

Examples of the leuco dyes for use in the present invention include those disclosed in, for example, the specification of U.S. Pat. No. 3,445,234, including (a) aminotriarylmethanes, (b) aminoxanthines, (C) aminothioxanthines, (d) amino-9,10-dihydroacridines, (e) aminophenoxazines, (f) aminophenothiazines, (g) aminodihydrophenazines, (h) aminodiphenylmethanes, (i) leuco indamines, (j) aminohydrocinnamic acids (cyanoethanes, leuco methines), (k) hydrazines, (l) leuco indigoid dyes, (m) amino-2,3-dihydroanthraquinones, (n) tetrahalo-p,p'-biphenols, (o) 2-(p-hydroxyphenyl)-4,5-diphenylimidazoles, and (p) phenethylanilines. Of these leuco dyes, the leuco dyes (a) to (i) lose one hydrogen atom to form a colored dye, whereas the leuco dyes (j) to (p) lose two hydrogen atoms to form a dye.

In particular, aminoarylmethanes are preferred, and aminotriarylmethanes are more preferred. Preferred aminotriarylmethanes generally include aminotriarylmethanes and acid salts thereof where at least two of the aryl groups are phenyl groups each having:

(a) an $R^1R^2N$-substituent at the para position to the bond to the methane carbon atom where $R^1$ and $R^2$ are each a moiety selected from hydrogen, $C_1$ to $C_{10}$ alkyl group, 2-hydroxyethyl group, 2-cyanoethyl group, and benzyl group; and (b) a substituent at an ortho position to the methane carbon atom, where the substituent is selected from lower alkyl group (i.e., having 1 to 4 carbon atoms), lower alkoxy group (i.e., having 1 to 4 carbon atoms), fluorine atom, chlorine atom, and bromine atom, and; the third aryl group (i.e., the remaining aryl group) may be the same as or different from the first and second aryl groups and, when different, is selected from (a) phenyl group optionally substituted by lower alkyl group, lower alkoxy group, chlorine atom, diphenylamino group, cyano group, nitro group, hydroxy group, fluorine atom, bromine atom, alkylthio group, arylthio group, thioester group, alkylsulfonic acid group, arylsulfonic acid group, sulfonic acid group, sulfonamide group, alkylamide group, arylamide group, or the like; (b) naphthyl group optionally substituted by amino group, di-lower-alkylamino group, or alkylamino group; (c) pyridyl group optionally substituted by alkyl group; (d) quinolyl group; and (e) indolinylidene group optionally substituted by alkyl group.

Preferably, $R^1$ and $R^2$ are each hydrogen atom or $C_1$ to $C_4$ alkyl group. Most preferably, all three aryl groups are the same.

Specific examples of such leuco dyes include tris(4-dimethylaminophenyl)methane, tris(4-diethylaminophenyl)methane, bis(4-diethylaminophenyl)-(4-diethylamino-2-methylphenyl)methane, bis(4-diethylamino-2-methylphenyl)-(4-diethylaminophenyl)methane, bis(1-ethyl-2-methylindol-3-yl)-phenylmethane, 2-N-(3-trifluoromethylphenyl)-N-ethylamino-6-diethylamino-9-(2-methoxycarbonylphenyl)xanthene, 2-(2-chlorophenyl)amino-6-dibu- tylamino-9-(2-methoxycarbonylphenyl)xanthene, 2-dibenzylamino-6-diethylamino-9-(2-methoxycarbonylphenyl)xanthene, benzo[a]-6-N,N-diethylamino-9,2-methoxycarbonylphenyl)xanthene, 2-(2-chlorophenyl)-amino-6-dibut- ylamino-9-(2-methylphenylcarboxamidophenyl)xanthene, 3,6-dimethoxy-9-(2-methoxycarbonyl)phenylxanthene, benzoyl leuco methylene blue, and 3,7-bis-diethylaminophenoxazine. Examples of commercially available leuco dyes include leuco crystal violet (LCV, Yamada Chemical Co., Ltd.).

[Photo-Oxidant]

The photo-oxidant used in the present invention is activated by ultraviolet to generate radicals. The use of the photo-oxidant allows the color density to change continuously depending on the ultraviolet irradiance and thus allows the ultraviolet dose to be visually determined.

The photo-oxidant used in the present invention may have any ε value at a wavelength of 350 nm, but preferably an ε value of 2,000 or less, more preferably 1,000 or less, even more preferably 500 or less. For example, the photo-oxidant may have an ε value of 320 or less, or 280 or less. The photo-oxidant used in the present invention may have any ε value at a wavelength of 250 nm, but preferably an ε value of 10,000 or more, more preferably 11,000 or more, even more preferably 12,000 or more. For example, the photo-oxidant may have an ε value of 12,730 or more. The use of such photo-oxidants further enhances the ultraviolet sensitive ability of the ultraviolet-sensing sheet according to the present invention. As used herein, the symbol "ε" refers to the molar absorption coefficient of the photo-oxidant, which can be measured, for example, with a ultraviolet spectrophotometer.

The photo-oxidant used in the present invention is preferably selected from photo-oxidants represented by Formulae (1) to (7) below. These photo-oxidants may be used alone or in mixture.

[Chem. 1]

Formula (1)

where A, B, and D are each independently a carbon ring or heteroaryl group unsubstituted or substituted by a substituent that does not interfere with dissociation of the dimer into imidazolyl groups or oxidation of the leuco dye.

The symbols A, B, and D are each independently a carbon ring or heteroaryl group unsubstituted or substituted by a substituent that does not interfere with dissociation of the dimer into imidazolyl groups or oxidation of the leuco dye.

The symbols B and D each preferably have 0 to 3 substituents. The symbol A preferably has 0 to 4 substituents.

For details of compounds represented by Formula (1) and methods of manufacture thereof, knowledge about lophine dimers is available, for example, as disclosed in the specification of U.S. Pat. No. 3,552,973, fourth column, line 22, to sixth column, line 3, the entire disclosure of which is incorporated herein by reference.

$$P^0—CX_3 \qquad \text{Formula (2)}$$

where $P^0$ represents hydrogen atom, halogen atom, or aryl group, and X represents halogen atom.

Examples of halogen atoms represented by $P^0$ and X include fluorine atom, chlorine atom, bromine atom, and iodine atom, preferably chlorine atom and bromine atom.

Examples of compounds represented by Formula (2) include carbon tetrachloride, carbon tetrabromide, p-nitrobenzotribromide, bromotrichloromethane, benzotrichloride, hexabromoethane, iodoform, 1,1,1-tribromo-2-methyl-2-propanol, 1,1,2,2-tetrabromoethane, 2,2,2-tribromoethanol, and 1,1,1-trichloro-2-methyl-2-propanol.

[Chem. 2]

Formula (3)

where R represents a substituent, and x represents an integer of 0 to 5.

The symbol R represents a substituent. Examples of substituents include nitro group, halogen atom, $C_1$ to $C_3$ alkyl group, $C_1$ to $C_3$ haloalkyl group, acetyl groups, haloacetyl group, and $C_1$ to $C_3$ alkoxy group. If R is present at a plurality of positions, each R may be the same or different.

The symbol x represents an integer of 0 to 5, preferably 0 to 3.

Examples of compounds represented by Formula (3) include o-nitro-α,α,α-tribromoacetophenone, m-nitro-α,α,α-tribromoacetophenone, p-nitro-α,α,α-tribromoacetophenone, α,α,α-tribromoacetophenone, and α,α,α-tribromo-3,4-dichloroacetophenone.

$$R^1—SO_2—X^1 \qquad \text{Formula (4)}$$

where $R^1$ represents an optionally substituted alkyl group or an optionally substituted aryl group, and $X^1$ is halogen atom.

The symbol $R^1$ represents an optionally substituted alkyl group or an optionally substituted aryl group. Preferred examples of optionally substituted alkyl groups include alkyl groups having 1 to 20 carbon atoms, more preferably alkyl groups having 1 to 10 carbon atoms, even more preferably alkyl groups having 1 to 6 carbon atoms.

Preferred examples of optionally substituted aryl groups include aryl groups having 6 to 20 carbon atoms, more preferably aryl groups having 6 to 14 carbon atoms, even more preferably aryl groups having 6 to 10 carbon atoms.

Examples of substituents include nitro group, halogen atom, $C_1$ to $C_3$ alkyl group, $C_1$ to $C_3$ haloalkyl group, acetyl group, haloacetyl group, and $C_1$ to $C_3$ alkoxy group.

Examples of halogen atoms represented by $X^1$ include fluorine, chlorine, bromine, and iodine, preferably chlorine and bromine.

Examples of compounds represented by Formula (4) include 2,4-dinitrobenzenesulfonyl chloride, o-nitrobenzenesulfonyl chloride, m-nitrobenzenesulfonyl chloride, 3,3'-diphenylsulfonedisulfonyl chloride, ethanesulfonyl chloride, p-bromobenzenesulfonyl chloride, p-nitrobenzenesulfonyl chloride, p-3-benzenesulfonyl chloride, p-acetamidobenzenesulfonyl chloride, p-chlorobenzenesulfonyl chloride, p-toluenesulfonyl chloride, methanesulfonyl chloride, and benzenesulfonyl bromide.

$$R^2—S—X^2 \qquad \text{Formula (5)}$$

where $R^2$ represents an optionally substituted alkyl group or an optionally substituted aryl group, and $X^2$ represents halogen atom.

The symbol $R^2$ represents an optionally substituted alkyl group or an optionally substituted aryl group as defined for $R^1$ in Formula (4), and preferred examples of alkyl and aryl groups are as listed above. Examples of halogen atoms represented by $X^2$ include fluorine, chlorine, bromine, and iodine, preferably chlorine and bromine.

Examples of compounds represented by Formula (5) include 2,4-dinitrobenzenesulfenyl chloride and o-nitrobenzenesulfenyl chloride.

[Chem. 3]

Formula (6)

where $R^3$ represents an optionally substituted aryl group or an optionally substituted heteroaryl group; and $X^3$, $X^4$, and $X^5$ are each independently hydrogen atom or halogen atom, with the proviso that not all of $X^3$, $X^4$, and $X^5$ are hydrogen atom.

The symbol $R^3$ represents an optionally substituted aryl group or an optionally substituted heteroaryl group.

Preferred examples of aryl groups include aryl groups having 6 to 20 carbon atoms, more preferably aryl groups having 6 to 14 carbon atoms, even more preferably aryl groups having 6 to 10 carbon atoms.

Preferred examples of heteroaryl groups include heteroaryl groups having 4 to 20 carbon atoms, more preferably heteroaryl groups having 4 to 13 carbon atoms, even more preferably heteroaryl groups having 4 to 9 carbon atoms.

Examples of substituents include nitro group, halogen atom, $C_1$ to $C_3$ alkyl group, $C_1$ to $C_3$ haloalkyl group, acetyl group, haloacetyl atom, and $C_1$ to $C_3$ alkoxy group.

Examples of halogen atoms represented by $X^3$, $X^4$, and $X^5$ include fluorine, chlorine, bromine, and iodine, preferably chlorine and bromine.

Examples of compounds represented by Formula (6) include hexabromodimethyl sulfoxide, pentabromodimethyl sulfoxide, hexabromodimethylsulfone, trichloromethylphenylsulfone, tribromomethylphenylsulfone, trichloromethylphenylsulfone, trichloro-p-chlorophenylsulfone, tribromomethyl-p-nitrophenylsulfone, 2-trichloromethylbenzothiazolesulfone, 4,6-dimethylpyrimidine-2-tribromomethylsulfone, tetrabromodimethylsulfone, 2,4-dichlorophenyltrichloromethylsulfone, 2-methyl-4-chlorophenyltrichloromethylsulfone, 2,5-dimethyl-4-chlorophenyltrichloromethylsulfone, 2,4-dichlorophenyltrimethylsulfone, tribromomethylphenylsulfone, and tri-p-tolylsulfonium trifluoromethanesulfonate.

Formula (7)

where $R^4$ represents an optionally substituted heteroaryl group; and $X^6$, $X^7$, and $X^8$ are each independently hydrogen atom or halogen atom, with the proviso that not all of $X^6$, $X^7$, and $X^8$ are hydrogen atom.

The symbol $R^4$ represents an optionally substituted heteroaryl group. Preferred examples of heteroaryl groups include heteroaryl groups having 4 to 20 carbon atoms, more preferably heteroaryl groups having 4 to 13 carbon atoms, even more preferably heteroaryl groups having 4 to 9 carbon atoms.

Examples of substituents include nitro group, halogen atom, $C_1$ to $C_3$ alkyl group, $C_1$ to $C_3$ haloalkyl group, acetyl group, haloacetyl atom, and $C_1$ to $C_3$ alkoxy group.

Examples of halogen atoms represented by $X^6$, $X^7$, and $X^8$ include fluorine, chlorine, bromine, and iodine, preferably chlorine and bromine.

Examples of compounds represented by Formula (7) include tribromoquinaldine, 2-tribromomethyl-4-methylquinoline, 4-tribromomethylpyrimidine, 4-phenyl-6-tribromomethylpyrimidine, 2-trichloromethyl-6-nitrobenzothiazole, 1-phenyl-3-trichloromethylpyrazole, 2,5-ditribromomethyl-3,4-dibromothiophene, 2-trichloromethyl-3-(p-butoxystyryl)-1,3,4-oxadiazole, 2,6-ditrichloromethyl-4-(p-methoxyphenyl)triazine, and 2-(4-methylphenyl)-4,6-bis(trichloromethyl)-1,3,5-triazine.

In particular, preferred are compounds represented by Formulae (3), (6), and (7), where the halogen atoms are preferably chlorine, bromine, or iodine. Compounds other than compounds represented by Formulae (1) to (7) can also be used, including diazo compounds such as bis(t-butylsulfonyl)diazomethane.

[Reductant]

The ultraviolet-sensing layer used in the present invention may contain a reductant. The reductant may be present inside or outside the capsules. The reductant functions to deactivate the photo-oxidant. The reductant prevents a rapid change in color density due to a rapid increase in the number of radicals generated from the photo-oxidant upon ultraviolet irradiation. This allows the color density to change continuously depending on the ultraviolet dose and thus allows the ultraviolet dose to be visually determined.

Such reductants may be used alone or in combination. Any reducing substance that functions to deactivate the photo-oxidant may be used.

The reductant used in the present invention may be any reductant that functions as a free-radical scavenger, i.e., a substance that traps free radicals generated from activated photo-oxidant. Examples of such reductants include organic reductants disclosed in the specification of U.S. Pat. No. 3,042,513 (e.g., hydroquinone, catechol, resorcinol, hydroxyhydroquinone, pyrrologlucinol, and aminophenols such as o-aminophenol and p-aminophenol) and cyclic phenylhydrazides disclosed in the specification of Japanese Examined Patent Application Publication No. 62-39726 (e.g., 1-phenylpyrazolidin-3-one (Phenidone A, formula (1) below), 1-phenyl-4-methylpyrazolidin-3-one (Phenidone B, formula (2) below), 1-phenyl-4,4-dimethylpyrazolidin-3-one (Dimezone, formula (3) below), 3-methyl-1-p-sulfophenyl)-2-pyrazolin-5-one, 3-methyl-1-phenyl-2-pyrazolin-5-one), and 4-hydroxymethyl-4-methyl-1-phenyl-3-pyrazolidinone (Dimezone S, Daito Chemical Co., Ltd.).

[Chem. 4]

(1)

(2)

(3)

The cyclic phenylhydrazides may be substituted on the phenyl group. Examples of substituents include methyl group, trifluoromethyl group, chlorine atom, bromine atom, fluorine atom, methoxy group, ethoxy group, p-benzyloxy group, butoxy group, p-phenoxy group, 2,4,6-trimethyl group, and 3,4-dimethyl group.

The cyclic phenylhydrazides may be substituted on position 4 of the heterocyclic group. Examples of substituents include bis-hydroxymethyl group, hydroxymethyl group, methyl group, ethyl group, and benzyl group. The cyclic phenylhydrazides may be substituted on position 5 of the heterocyclic group. Examples of substituents include methyl and phenyl.

Other reductants may also be used, including guanidines, alkylenediamines, and hydroxyamines.

Examples of guanidines include phenylguanidine, 1,3-diphenylguanidine, 1,2,3-triphenylguanidine, 1,2-dicyclohexylguanidine, 1,2,3-tricyclohexylguanidine, 1,3-di-o-tolylguanidine, o-tolyldiphenylguanidine, m-tolyldiphenylguanidine, p-tolyldiphenylguanidine, N,N'-dicyclohexyl-4-morpholinocarboxyamidine, 1,3-ditolyl-3-phenylguanidine, 1,2-dicyclohexylphenylguanidine, 1-o-tolylbiguanide, and N-benzylidene-guanidinoamine.

Examples of alkylenediamines include ethylenediamine, propylenediamine, tetramethylenediamine, hexamethylenediamine, octamethylenediamine, 1,1,2-diaminododecane, and tetrabenzylethylenediamine.

Examples of hydroxyamines include diethanolamine, triethanolamine, and 3-β-naphthyloxy-1-N,N-dimethylamino-2-propanol.

The reductant used for the sheet according to the present invention may be dispersed in the form of solids, for example, in a sand mill, or may be dissolved and emulsified in oil.

The reductant may be dispersed in the form of solids in a solution of a water-soluble polymer with a concentration of 2% to 30% by weight. The dispersed particles preferably have a particle size of 10 μm or less. Preferred examples of water-soluble polymers include those used for the preparation of capsules. The reductant can be emulsified using the techniques and materials disclosed in Japanese Unexamined Patent Application Publication No. 63-045084.

If the reductant is present outside the capsules, the molar ratio of the photo-oxidant to the reductant is preferably 1:0.1 to 100, more preferably 1:0.5 to 0.50, even more preferably 1:1 to 10.

If the reductant is present inside the capsules, the molar ratio of the photo-oxidant to the reductant is preferably 1:0.001 to 0.1, more preferably 1:0.005 to 0.08, even more preferably 1:0.01 to 0.05.

<<<Formation of Ultraviolet-Sensing Layer>>>

The ultraviolet-sensing layer can be formed by coating or impregnating a support or reflective layer with a dispersion of capsules containing the leuco dye and the photo-oxidant described above or by forming a self-supported layer from the capsule dispersion.

The amount of ultraviolet-sensing layer coating composition applied to form the ultraviolet-sensing layer is preferably 3 to 30 g/m$^2$, more preferably 5 to 20 g/m$^2$, on a solid basis. If the amount of coating composition applied falls below 3 g/m$^2$, the resulting coating has an insufficient concentration. If the amount of coating composition applied exceeds 30 g/m$^2$, the resulting coating has no higher quality and is disadvantageous in terms of cost.

The ultraviolet-sensing layer coating composition can be applied by commonly known coating processes such as dip coating, air knife coating, curtain coating, roller coating, doctor coating, wire bar coating, slide coating, gravure coating, spin coating, and extrusion coating using hoppers, as disclosed in the specification of U.S. Pat. No. 2,681,294.

<<<Support>>>

Any support may be used in the present invention without departing from the spirit of the present invention.

Examples of materials suitable for the support include materials commonly used in graphic art and decoration, including paper; films of plastics and polymers, such as regenerated cellulose, cellulose acetate, cellulose nitrate, poly(ethylene terephthalate), vinyl polymers and copolymers, polyethylene, polyvinyl acetate, poly(methyl methacrylate), and poly(vinyl chloride); woven fabric; glass; wood; and metals.

The support preferably has a thickness of 5 to 250 μm, more preferably 25 to 150 μm, even more preferably 50 to 100 μm.

<<<Layer for Adjusting Ultraviolet-Sensitivity and Film for Adjusting Ultraviolet-Sensitivity>>>

In the present invention, the layer for adjusting ultraviolet-sensitivity is disposed on the surface, away from the support, of the ultraviolet-sensing layer. The layer for adjusting ultraviolet-sensitivity adjusts the ultraviolet irradiance that contributes to develop color so that the ultraviolet-sensing sheet can continuously develop color depending on the cumulative illuminance of ultraviolet.

The layer for adjusting ultraviolet-sensitivity may be any layer that affects the ultraviolet irradiance that contributes to develop color, for example, a common substrate or film which may be used for protecting a surface, laminating and the like.

The layer for adjusting ultraviolet-sensitivity preferably has a transmittance at 300 nm of 10% or less and a transmittance at 450 nm of 70% or more, more preferably a transmittance at 300 nm of 8% or less and a transmittance at 450 nm of 80% or more, even more preferably a transmittance at 300 nm of 5% or less and a transmittance at 450 nm of 90% or more.

The film for adjusting ultraviolet-sensitivity used in the embodiment where the layer for adjusting ultraviolet-sensitivity is separately provided may be similar to the layer for adjusting ultraviolet-sensitivity.

The layer for adjusting ultraviolet-sensitivity used in the present invention may be any layer that affects the ultraviolet irradiance that contributes to develop color, for example, a pigment-particle containing layer, an ultraviolet-absorber containing layer, or a common substrate or film which may be used for protecting a surface, laminating and the like.

[Pigment-Particle Containing Layer]

The pigment-particle containing layer is preferably formed by coating on one surface of the support and preferably contains a binder and pigment particles. The pigment particles are preferably present in the layer for adjusting ultraviolet-sensitivity in an amount of 30% to 90% of the total mass of the binder and the pigment particles in the layer for adjusting ultraviolet-sensitivity.

The layer for adjusting ultraviolet-sensitivity may further contain other optional components, such as various additives.

The layer for adjusting ultraviolet-sensitivity used in the present invention preferably contains at least one type of pigment particles. The pigment particles may be the same as or different from those present in the polymer substrate. For example, inorganic pigments, such as titanium dioxide, barium sulfate, silicon oxide, aluminum oxide, magnesium oxide, kaolin, and talc, may be selected. In particular, titanium dioxide is preferred. Examples of commercially available inorganic pigments include the TIPAQUE series, such as TIPAQUE R780-2 (Ishihara Sangyo Kaisha, Ltd.).

The pigment particles are preferably present in an amount of 5 g or more, more preferably 8 g or more, even more preferably 10 g or more, per 1 m$^2$ of the layer for adjusting ultraviolet-sensitivity. The pigment particles should be present in an amount of 30 g or less, although no critical upper limit is defined. If the pigment particles are present in an amount of 5 g or more, the necessary reflectance can be readily achieved. If the pigment particles are present in an amount of 30 g or less, the weight of the sheet according to the present invention can be readily reduced.

The pigment particles preferably have an average particle size of 0.01 μm or more, more preferably 0.05 μm or more, even more preferably 0.08 μm or more. The pigment particles preferably have an average particle size of 10 μm or less, more preferably 8 μm or less, although no critical upper limit is defined. Pigment particles having such average particle sizes have high light reflectivity. The average particle size is measured with an LA950 laser scattering particle size distribution analyzer (HORIBA, Ltd.).

The layer for adjusting ultraviolet-sensitivity used in the present invention preferably contains at least one binder. The binder is preferably present in an amount of 0.5 to 5.0 g/m$^2$, more preferably 1 to 3 g/m$^2$. If the binder is present in an amount of 0.5 g/m$^2$ or more, the layer for adjusting ultraviolet-sensitivity has sufficient strength. If the binder is present in an amount of 5 g/m$^2$ or less, the layer for adjusting ultraviolet-sensitivity has suitable reflectance and mass.

Examples of binders suitable for the layer for adjusting ultraviolet-sensitivity used in the present invention include polyesters, polyurethanes, acrylic resins, and polyolefins. In particular, acrylic resins and polyolefins are preferred because of their durability. Preferred acrylic resins include acrylic-silicone hybrid resins. Preferred examples of polyolefin binders include CHEMIPEARL S-120 and S-75N (Mitsui Chemicals, Inc.). Preferred examples of acrylic resin binders include JURYMER ET-410 and SEK-301 (Nihon Junyaku Co., Ltd.). Preferred examples of acrylic-silicone hybrid resin binders include CERANATE WSA1060 and WSA1070 (DIC Corporation) and H7620, H7630, and H7650 (Asahi Kasei Chemicals Corporation).

[Common Substrate or Film for Applications Such as Surface Protection and Lamination]

The layer for adjusting ultraviolet-sensitivity may be any layer that affects the ultraviolet irradiance that contributes to develop color, for example, a common substrate or film which may be used for protecting a surface, laminating and the like.

Such substrates or films are particularly preferred as films for adjusting ultraviolet-sensitivity for use in ultraviolet-sensing kits.

The substrate or film may be selected from known materials. Specific examples of substrates and films include acid-free paper; acid paper; recycled paper; polyolefin laminates; synthetic paper; polyester films; polyimide films; cellulose derivative films, such as cellulose triacetate films; polystyrene films; polyolefin films, such as polypropylene films and polyethylene films; poly-4-methylpentene-1; ionomers; poly(vinyl chloride); poly(vinylidene chloride); ABS resins; AS resins; methacrylic resins; poly(vinyl alcohol); EVA; epoxy resins; unsaturated polyester resins; phenolic resins; urea-melamine resins; polyurethane resins; silicone resins; polyamide resins; polyacetals; polycarbonates; modified poly(phenylene ether)s; polyester resins; fluoropolymer resins; poly(phenylene sulfide)s; polysulfones; polyarylates; polyetherimides; polyethersulfones; polyetherketones; polyamideimides; polyarylethernitriles; polybenzimidazoles; metal foils; films of mixtures thereof; and sheets of combinations thereof.

To effectively prevent deformation such as curling, the substrate or film preferably has a thermal shrinkage of less than 1%, more preferably 0.5% or less, in longitudinal and transverse directions.

In particular, polymer films are preferred to achieve transparency. Examples of polymer films include synthetic polymer films, including polyester films, such as poly(ethylene terephthalate), poly(butylene terephthalate), and poly(ethylene naphthalate) films; cellulose triacetate films; and polyolefin films, such as polypropylene and polyethylene films. Also preferred are poly(ethylene naphthalate) (PEN) and polyimide (PI), which are resistant to elevated temperatures.

[Additives]

The layer for adjusting ultraviolet-sensitivity used in the present invention may optionally contain components other than binders and pigment particles. Examples of such components include additives such as ultraviolet absorbers, crosslinking agents, surfactants, and fillers.

Examples of crosslinking agents include epoxy crosslinking agents, isocyanate crosslinking agents, melamine crosslinking agents, carbodiimide crosslinking agents, and oxazolidine crosslinking agents. In particular, oxazolidine crosslinking agents are preferred. Specifically, oxazolidine crosslinking agents usable for a readily bondable layer described later are preferred.

The crosslinking agent, when used, is preferably present in an amount of 5% to 50% by mass, more preferably 10% to 40% by mass, of the binder in the layer for adjusting ultraviolet-sensitivity. If the crosslinking agent is present in an amount of 5% by mass or more, it has a sufficient crosslinking effect while maintaining the strength and adhesion of the layer for adjusting ultraviolet-sensitivity. If the crosslinking agent is present in an amount of 50% by mass or less, the coating composition has a prolonged pot life.

The surfactant may be selected from known surfactants such as anionic surfactants and nonionic surfactants. The surfactant, when used, is preferably present in an amount of 0.1 to 15 mg/m$^2$, more preferably 0.5 to 5 mg/m$^2$. If the surfactant is present in an amount of 0.1 mg/m$^2$ or more, a smooth layer can be formed without repellency. If the surfactant is present in an amount of 15 mg/m$^2$ or less, the layer for adjusting ultraviolet-sensitivity has high adhesion.

The layer for adjusting ultraviolet-sensitivity used in the present invention may contain fillers such as silica in addition to the pigment particles. The filler, when used, is preferably present in an amount of 20% by mass or less, more preferably 15% by mass or less, of the binder in the reflective layer. If the filler is present in an amount of 20% by mass or less, the layer for adjusting ultraviolet-sensitivity has the necessary reflectance and adhesion to the ultraviolet-sensing layer.

The layer for adjusting ultraviolet-sensitivity used in the present invention may contain an ultraviolet absorber. Alternatively, a layer containing an ultraviolet absorber may be separately provided. The ultraviolet absorber may be used instead of or in combination with the pigment particles.

Any ultraviolet absorber may be selected depending on the purpose. Examples of ultraviolet absorbers include benzophenone ultraviolet absorbers, benzotriazole ultraviolet absorbers, triazine ultraviolet absorbers, salicylate ultraviolet absorbers, and cyanoacrylate ultraviolet absorbers. These ultraviolet absorbers may be used alone or in combination.

Any benzophenone ultraviolet absorber may be selected depending on the purpose. Examples of benzophenone ultraviolet absorbers include 2-hydroxy-4-methoxy-5-sulfobenzophenone.

Any benzotriazole ultraviolet absorber may be selected depending on the purpose. Examples of benzotriazole ultraviolet absorbers include 2-(5-chloro-2H-benzotriazol-2-yl)-4-methyl-6-tert-butylphenol (TINUVIN 326), 2-(2-hydroxy-5-methylphenyl)benzotriazole, 2-(2-hydroxy-5-tert-butylphenyl)benzotriazole, and 2-(2-hydroxy-3-5-di-tert-butylphenyl)-5-chlorobenzotriazole.

Any triazine ultraviolet absorber may be selected depending on the purpose. Examples of triazine ultraviolet absorbers include mono(hydroxyphenyl)triazines, bis(hydroxyphenyl)triazines, and tris(hydroxyphenyl)triazines.

Examples of mono(hydroxyphenyl)triazines include 2-[4-[(2-hydroxy-3-dodecyloxypropyl)oxy]-2-hydroxyphenyl]-4,6-bis(2,4-dimethylphenyl)-1,3,5-triazine, 2-[4-[(2-hydroxy-3-tridecyloxypropyl)oxy]-2-hydroxyphenyl]-4,6-bis(2,4-dimethylphenyl)-1,3,5-triazine, 2-(2,4-dihydroxyphenyl)-4,6-bis(2,4-dimethylphenyl)-1,3,5-triazine, 2-(2-hydroxy-4-isooctyloxyphenyl)-4,6-bis(2,4-dimethylphenyl)-1,3,5-triazine, and 2-(2-hydroxy-4-dodecyloxyphenyl)-4,6-bis(2,4-dimethylphenyl)-1,3,5-triazine. Examples of bis(hydroxyphenyl)triazines include 2,4-bis(2-hydroxy-4-propyloxyphenyl)-6-(2,4-dimethylphenyl)-1,3,5-triazine, 2,4-bis(2-hydroxy-3-methyl-4-propyloxyphenyl)-6-(4-methylphenyl)-1,3,5-triazine, 2,4-bis(2-hydroxy-3-methyl-4-hexyloxyphenyl)-6-(2,4-dimethylphenyl)-1,3,5-triazine, and 2-phenyl-4,6-bis[2-hydroxy-4-[3-(methoxyheptaethoxy)-2-hydroxypropyloxy]phenyl]-1,3,5-triazine. Examples of tris (hydroxyphenyl)triazines include 2,4-bis(2-hydroxy-4-butoxyphenyl)-6-(2,4-dibutoxyphenyl)-1,3,5-triazine, 2,4,6-tris(2-hydroxy-4-octyloxyphenyl)-1,3,5-triazine, 2,4,6-tris[2-hydroxy-4-(3-butoxy-2-hydroxypropyloxy)phenyl]-1,3,5-triazine, 2,4-bis[2-hydroxy-4-[1-(isooctyloxycarbonyl)ethoxy]phenyl]-6-(2,4-dihydroxyphenyl)-1,3,5-triazine, 2,4,6-tris[2-hydroxy-4-[1-(isooctyloxycarbonyl)ethoxy]phenyl]-1,3,5-triazine, and 2,4-bis[2-hydroxy-4-[1-(isooctyloxycarbonyl)ethoxy]phenyl]-6-[2,4-bis[1-(isooctyloxycarbonyl)ethoxy]phenyl]-1,3,5-triazine. Examples of commercially available triazine ultraviolet absorbers include TINUVIN 477 (BASF).

Any salicylate ultraviolet absorber may be selected depending on the purpose. Examples of salicylate ultraviolet absorbers include phenyl salicylate, p-tert-butylphenyl salicylate, p-octylphenyl salicylate, and 2-ethylhexyl salicylate.

Any cyanoacrylate ultraviolet absorber may be selected depending on the purpose. Examples of cyanoacrylate ultraviolet absorbers include 2-ethylhexyl 2-cyano-3,3-diphenylacrylate and ethyl 2-cyano-3,3-diphenylacrylate.

The layer for adjusting ultraviolet-sensitivity may be have a layer containing an ultraviolet absorber as a separate layer. At that time, the layer contains other optional components such as binders. Any binder may be selected depending on the purpose. Examples of binders include acrylic resins, poly(vinyl butyral), and poly(vinyl alcohol). The ultraviolet-absorber containing layer is preferably made of a material that exhibits no absorption in a range from 450 to 1,500 nm and is preferably thinner.

The ultraviolet-absorber containing layer preferably has a thickness of 0.01 to 1,000 μm, more preferably 0.02 to 500 μm. A ultraviolet-absorber containing layer having a thickness of less than 0.01 μm may insufficiently absorb ultraviolet radiation. A ultraviolet-absorber containing layer having a thickness of more than 1,000 μm may have low visible transmittance.

The content of the ultraviolet absorber varies depending on the type of ultraviolet absorber used and cannot be simply determined; it is preferably selected so that the desired ultraviolet sensitivity adjustment function can be achieved in the present invention.

<<Formation of Layer for Adjusting Ultraviolet-Sensitivity>>

The layer for adjusting ultraviolet-sensitivity used in the present invention is formed on at least one surface of the support by applying a layer for adjusting ultraviolet-sensitivity coating composition containing components selected from, for example, pigment particles, binders, and other additives such as ultraviolet absorbers.

Preferred layer for adjusting ultraviolet-sensitivity coating compositions include those containing at least pigment particles and a binder and those containing at least a ultraviolet absorber and a binder. layer for adjusting ultraviolet-sensitivity coating compositions containing both pigment particles and a ultraviolet absorber are also preferred.

The coating composition can be applied by known coating processes such as gravure coating and bar coating.

The coating composition may be a water-based coating composition containing water as a coating solvent or may be a solvent-based coating composition containing an organic solvent such as toluene or methyl ethyl ketone. In particular, a preferred solvent is water, which is environmentally friendly. Such coating solvents may be used alone or in mixture. Preferred examples of the coating solvents include water and a mixture of water and methyl alcohol in a mass ratio of 95:5.

The layer for adjusting ultraviolet-sensitivity coating composition may be applied to the surface of the polymer substrate directly or with a primer layer having a thickness of 2 μm or less therebetween to form the layer for adjusting ultraviolet-sensitivity on the polymer substrate.

The layer for adjusting ultraviolet-sensitivity coating composition is preferably applied in an amount of 2 $g/m^2$ or more, more preferably 5 $g/m^2$ or more, on a solid basis. The layer for adjusting ultraviolet-sensitivity coating composition should be applied in an amount of 20 $g/m^2$ or less, although no critical upper limit is defined. If the layer for adjusting ultraviolet-sensitivity coating composition is applied in an amount of less than 2 $g/m^2$, the layer for adjusting ultraviolet-sensitivity has an insufficient ultraviolet barrier effect.

The layer for adjusting ultraviolet-sensitivity preferably has a thickness of 0.5 to 20 μm, more preferably 1 to 15 μm, even more preferably 2 to 10 μm.

<<<Reflective Layer>>>

The present invention may include a reflective layer between the support and the ultraviolet-sensing layer or on a surface of the support, the surface being away from the ultraviolet-sensing layer. The reflective layer can be provided to improve the reflection density. The reflective layer is not necessary if the support itself is reflective; if the support is transparent, the reflective layer is preferably provided to reduce light transmission.

The reflective layer used in the present invention is preferably formed by coating on one surface of the support and preferably contains a binder and white inorganic particles. The white inorganic particles are preferably present in the reflective layer in an amount of 30% to 90% of the total mass of the binder and the white inorganic particles in the reflective layer.

The reflective layer may further contain other optional components, such as various additives.

Also, the reflective layer, if necessary, may be provided, such as adhesive layer and gloss layer.

[White Inorganic Particles]

The reflective layer used in the present invention preferably contains at least one kind of white inorganic particles. The white inorganic pigment may be the same as or different from the white inorganic particles present in the polymer substrate. For example, inorganic pigments, such as titanium dioxide, barium sulfate, silicon oxide, aluminum oxide, magnesium oxide, calcium carbonate, kaolin, and talc, may be selected. In particular, titanium dioxide is preferred.

Examples of commercially available inorganic pigments include the TIPAQUE series, such as TIPAQUE R780-2 (Ishihara Sangyo Kaisha, Ltd.).

The white inorganic particles are preferably present in the reflective layer used in the present invention in an amount of 30% to 90% by mass, more preferably 50% to 85% by mass, of the total mass of the binders and the white inorganic particles in the reflective layer. If the white inorganic particles are present in an amount of less than 30% by mass, the reflective layer has low reflectance. If the white inorganic particles are present in an amount of more than 90% by mass, the weight of the reflective layer cannot be reduced.

The white inorganic particles are preferably present in the reflective layer used in the present invention in an amount of 4 to $g/m^2$, more preferably 5 to 11 $g/m^2$. If the white inorganic particles are present in an amount of 4 $g/m^2$ or more, the necessary reflectance can be readily achieved. If the white inorganic particles are present in an amount of 12 $g/m^2$ or less, the weight of the sheet according to the present invention can be readily reduced.

If the reflective layer contains two or more types of white inorganic particles, the total amount of white inorganic particles present in the reflective layer must be 4 to 12 $g/m^2$.

The white inorganic particles preferably have an average particle size of 0.1 to 10 μm, more preferably about 0.3 to about 8 μm, in terms of volume average particle size. White inorganic particles having such average particle sizes have high light reflectivity. The average particle size is measured with an LA950 laser scattering particle size distribution analyzer (HORIBA, Ltd.).

[Binder]

The reflective layer used in the present invention preferably contains at least one binder. The binder is preferably present in an amount of 0.5 to 5.0 $g/m^2$, more preferably 1 to 3 $g/m^2$. If the binder is present in an amount of 0.5 $g/m^2$ or more, the reflective layer has sufficient strength. If the binder is present in an amount of 5 $g/m^2$ or less, the reflective layer has suitable reflectance and mass.

Examples of binders suitable for the reflective layer used in the present invention include poly(vinyl alcohol) (PVA), modified poly(vinyl alcohol)s, hydroxyethyl cellulose, hydroxypropyl cellulose, epichlorohydrin-modified polyamides, ethylene-maleic anhydride copolymers, styrene-maleic anhydride copolymers, isobutylene-maleic anhydride-salicylic acid copolymers, polyacrylic acid, polyacrylamide, methylol-modified polyacrylamides, starch derivatives, casein, gelatin, and styrene-butadiene rubber (SBR). To impart water resistance to these binders, water resistance improvers and hydrophobic polymer emulsions such as acrylic resin emulsions and styrene-butadiene latex may be added. To provide high transparency, poly(vinyl alcohol) is preferably used, and modified PVAs such as carboxy-modified poly(vinyl alcohol)s and alkyl ether-modified poly(vinyl alcohol)s can also be used.

[Additives]

The reflective layer used in the present invention may optionally contain components other than binders and white inorganic particles. Any other component may be selected depending on the purpose and need. Examples of other components include crosslinking agents, surfactants, and fillers.

The crosslinking agent may be selected from known crosslinking agents. Examples of crosslinking agents include water-soluble initial condensates, such as N-methylolurea, N-methylolmelamine, and urea-formalin; dialdehydes, such as glyoxal and glutaraldehyde; inorganic crosslinking agents, such as boric acid and borax; and polyamide-epichlorohydrin.

If a water-soluble polymer (e.g., gelatin or poly(vinyl alcohol)) is used as the binder, it can be crosslinked with the crosslinking agent to further improve the storage stability.

The crosslinking agent, when used, is preferably present in an amount of 5% to 50% by mass, more preferably 10% to 40% by mass, of the binder in the reflective layer. If the crosslinking agent is present in an amount of 5% by mass or more, it has a sufficient crosslinking effect while maintaining the strength and adhesion of the reflective layer. If the crosslinking agent is present in an amount of 50% by mass or less, the coating composition has a prolonged pot life.

The surfactant may be selected from known surfactants such as anionic surfactants and nonionic surfactants. The surfactant, when used, is preferably present in an amount of 0.1 to 15 $mg/m^2$, more preferably 0.5 to 5 $mg/m^2$. If the surfactant is present in an amount of 0.1 $mg/m^2$ or more, a smooth layer can be formed without repellency. If the surfactant is present in an amount of 15 $mg/m^2$ or less, the layer for adjusting ultraviolet-sensitivity has high adhesion.

The reflective layer used in the present invention may contain fillers such as silica in addition to the white inorganic particles. The filler, when used, is preferably present in an amount of 20% by mass or less, more preferably 15% by mass or less, of the binder in the reflective layer. If the filler is present in an amount of 20% by mass or less, the reflective layer has the necessary reflectance and adhesion to the support.

<<Formation of Reflective Layer>>

The reflective layer used in the present invention is formed on at least one surface of the support by applying a reflective layer coating composition containing white inorganic particles, a binder, and other additives.

The coating composition can be applied by known coating processes such as gravure coating and bar coating.

The coating composition may be a water-based coating composition containing water as a coating solvent or may be a solvent-based coating composition containing an organic solvent such as toluene or methyl ethyl ketone. In particular, a preferred solvent is water, which is environmentally friendly. Such coating solvents may be used alone or in mixture. Preferred examples of the coating solvents include water and a mixture of water and methyl alcohol in a mass ratio of 95:5.

The reflective layer coating composition may be applied to the surface of the polymer substrate directly or with a primer layer having a thickness of 2 μm or less therebetween to form the reflective layer on the polymer substrate.

The reflective layer coating composition is preferably applied in an amount of 5 $g/m^2$ or more, more preferably 10 $g/m^2$ or more, on a solid basis. The reflective layer coating composition should be applied in an amount of 30 $g/m^2$ or less, although no critical upper limit is defined. If the reflective layer coating composition is applied in an amount of less than 5 $g/m^2$, the reflective layer has insufficient reflection density.

The reflective layer preferably has a thickness of 5 to 30 μm, more preferably 7 to 20 μm, even more preferably 9 to 15 μm.

<Method for Sensing Ultraviolet>

The ultraviolet-sensing sheet according to the present invention makes possible to continuously develop color depending on the cumulative illuminance and thus allows the ultraviolet dose to be visually determined and detected. In particular, the ultraviolet-sensing sheet is suitable in determination of ultraviolet doses in a range from 1 to 1,000 mJ/cm$^2$ and can thus be widely used in a method for detecting ultraviolet and a method for measuring ultraviolet. By the ultraviolet-sensing sheet of the present invention is a sheet form or a film form, the ultraviolet-sensing sheet can also measure the ultraviolet irradiance over a wide area.

The ultraviolet-sensing sheet according to the present invention, since a sheet form or a film form, can be simply placed on a site where measurement ultraviolet radiation is intended to measure ultraviolet radiation.

<Application of Ultraviolet-Sensing Sheet>

The ultraviolet-sensing sheet according to the present invention, which allows the ultraviolet dose to be visually determined, facilitates ultraviolet illuminance over a wide area, and particularly, is effective in determination of ultraviolet doses in a range from 1 to 1,000 mJ/cm$^2$, can be used in various applications. For example, when a film is manufactured in a roll-to-roll process by curing a ultraviolet-curable resin with ultraviolet radiation from a ultraviolet irradiation system, the ultraviolet-sensing sheet can be used to measure the ultraviolet dose of the ultraviolet-curable resin without using a ultraviolet dosimeter. The ultraviolet-sensing sheet can also be used for routine measurement of ultraviolet dose during daytime, for example, to access sun damage to human skin and other objects.

EXAMPLES

The present invention is further illustrated by the following examples. The following specific examples should not be construed as limiting the scope of the present invention; various modifications may be made to the conditions illustrated in the following examples, including the types, amounts, and ratios of materials used and the types and sequences of processes, without departing from the spirit of the present invention. The term "part(s)", indicating the amount of material added, means part(s) by weight.

Example 1

(Preparation of Ultraviolet-Sensing Kit)

A mixture having the following composition was added to an aqueous solution containing 63 parts of 8 weight % aqueous poly(vinyl alcohol) solution and 100 parts of distilled water. The mixture was emulsified at 20° C. to give an emulsion having a volume average particle size of 1 µm. The resulting emulsion was stirred at 40° C. for 3 hours. The emulsion was then cooled to room temperature and was filtered to give an aqueous capsule dispersion.

| -Composition of Mixture- | |
|---|---|
| Leuco dye: leuco crystal violet (LCV, Yamada Chemical Co., Ltd.) | 3.0 parts |
| Photo-oxidant: tribromomethylphenylsulfone (BMPS) | 1.5 parts |
| Methylene chloride | 22 parts |
| Tricresyl phosphate | 24 parts |
| TAKENATE D-110N (75 weight % solution in ethyl acetcate, Mitsui Chemicals, Inc.) | 24 parts |

A mixture having the following composition was then dispersed in a DYNO-MILL (Willy A. Bachofen AG) to give a dispersion of 4-hydroxymethyl-4-methyl-1-phenyl-3-pyrazolidinone (Dimezone S) having an average particle size of 3 µm.

| Composition of Mixture | |
|---|---|
| 4 weight % aqueous poly (vinyl alcohol) solution | 150 parts |
| Reductant: 4-hydroxymethyl-4-methyl-1-phenyl-3-pyrazolidinone (Dimezone S, Daito Chemical Co., Ltd.) | 30 parts |

A mixture was prepared from 9 parts of the resulting capsule dispersion and 9 parts of the resulting Dimezone S dispersion, was applied to a foamed poly(ethylene terephthalate) base having a thickness of 75 µm (Crisper K1212, Toyobo Co., Ltd.) in an amount of 10 g/m$^2$ on a solid basis, and was dried by heating at 50° C. for 1 minute to prepare a sheet containing an ultraviolet-sensing layer.

A mixture having the following composition was dispersed in a DYNO-MILL (Willy A. Bachofen AG) to give a dispersion of titanium oxide particles having an average particle size of 0.1 µm.

| Composition of Mixture | |
|---|---|
| 4 weight % aqueous poly (vinyl alcohol) solution | 80 parts |
| Titanium oxide (TIPAQUE R780-2, Ishihara Sangyo Kaisha, Ltd. | 50 parts |

A mixture was prepared from 10 parts of the resulting titanium oxide dispersion and 10 parts of 6 weight % aqueous poly(vinyl alcohol) solution, was applied to a poly(ethylene terephthalate) base in an amount of 5 g/m$^2$ on a solid basis, and was dried at 80° C. for 1 minute to form a film for adjusting ultraviolet-sensitivity.

Example 2

A ultraviolet-sensing kit was prepared as in Example 1 except that the titanium oxide dispersion used for the film for adjusting ultraviolet-sensitivity in Example 1 was replaced with 0.5 part of a ultraviolet absorber (TINUVIN 477, BASF).

Example 3

A ultraviolet-sensing kit was prepared as in Example 1 except that the film for adjusting ultraviolet-sensitivity in Example 1 was replaced with a 75 µm thick poly(ethylene naphthalate) (PEN) (Q51, Teijin DuPont Films Japan Limited).

Example 4

<Preparation of Ultraviolet-Sensing Sheet>

A ultraviolet-sensing sheet was prepared by forming a layer for adjusting ultraviolet-sensitivity on the ultraviolet-sensing layer of the ultraviolet-sensing-layer containing film prepared in Example 1 as follows instead of using the film for adjusting ultraviolet-sensitivity in Example 1.

<<Formation of Layer for Adjusting Ultraviolet-Sensitivity>>

A mixture having the following composition was dispersed in a DYNO-MILL (Willy A. Bachofen AG) to give a dispersion of titanium oxide particles having an average particle size of 0.1 µm.

| Composition of Mixture | |
|---|---|
| 4 weight % aqueous poly (vinyl alcohol) solution | 80 parts |
| Titanium oxide (TIPAQUE R780-2, Ishihara Sangyo Kaisha, Ltd.) | 50 parts |

A mixture was prepared from 10 parts of the resulting titanium oxide dispersion and 10 parts of 6 weight % aqueous poly(vinyl alcohol) solution, was applied to the ultraviolet-sensing layer in an amount of 5 g/m² on a solid basis, and was dried at 80° C. for 1 minute.

Example 5

A ultraviolet-sensing sheet was prepared as in Example 4 except that the titanium oxide dispersion used for the layer for adjusting ultraviolet-sensitivity in Example 4 was replaced with 0.5 part of a ultraviolet absorber (TINUVIN 477, BASF).

Comparative Example 1

A ultraviolet-sensing sheet was prepared as in Example 1 except that no film for adjusting ultraviolet-sensitivity was used.

Comparative Example 2

A film for adjusting ultraviolet-sensitivity was prepared as in Example 1 except that the titanium oxide used for the film for adjusting ultraviolet-sensitivity in Example 1 was replaced with calcium carbonate (Brilliant-15, particle size: 3 µm, Shiraishi Calcium Kaisha, Ltd.).

Comparative Example 3

A film for adjusting ultraviolet-sensitivity was prepared as in Example 1 except that the titanium oxide dispersion used for the film for adjusting ultraviolet-sensitivity in Example 1 was replaced with 0.1 part of a black dye (Black E-XF, Sumitomo Chemtex Co., Ltd.).

Comparative Example 4

A ultraviolet-sensing kit was prepared as in Example 1 except that the amount of photo-oxidant was changed from 1.5 parts in Example 1 to 0.3 part.

Comparative Example 5

A ultraviolet-sensing kit was prepared as in Example 1 except that the amount of photo-oxidant was changed from 1.5 parts in Example 1 to 4.5 parts.

Comparative Example 6

A ultraviolet-sensing kit was prepared as in Example 1 except that the amount of photo-oxidant was changed from 1.5 parts in Example 1 to 0.25 part, and the amount of leuco dye was changed from 3.0 parts in Example 1 to 0.5 part.

Comparative Example 7

A ultraviolet-sensing kit was prepared as in Example 1 except that the amount of photo-oxidant was changed from 1.5 parts in Example 1 to 0.65 part, and the amount of leuco dye was changed from 3.0 parts in Example 1 to 13 parts.

[Measurement of ε (Photosensitive Region) of Photo-Oxidant]

The ε values (molar absorption coefficients) at wavelengths of 250 and 350 nm were measured with a spectrophotometer (U-2000, Hitachi High-Technologies Corporation).

(Evaluations)

The resulting ultraviolet-sensing sheets and ultraviolet-sensing kits of the Examples and the Comparative Examples were tested and evaluated for their sensitivities at 10 mJ/cm², 100 mJ/cm², and 1,000 mJ/cm² and reusability as follows. The results are summarized in the table below.

[Sensitivity at 10 mJ/cm²]

The ultraviolet-sensing sheets were irradiated with ultraviolet radiation from a high-pressure mercury lamp (high-pressure ultraviolet lamp, Ushio Inc.) to a cumulative illuminance of 10 mJ/cm². The change in color after the irradiation was measured with a reflection densitometer (X-Rite 310, X-Rite Inc.). The color density measured at a wavelength of 365 nm was evaluated according to the following criteria:

A: 0.15 or less

B: more than 0.15 and 0.3 or less

C: more than 0.3

[Sensitivity at 100 mJ/cm²]

The ultraviolet-sensing sheets were irradiated with ultraviolet radiation from a high-pressure mercury lamp (high-pressure ultraviolet lamp, Ushio Inc.) to a cumulative illuminance of 100 mJ/cm². The change in color after the irradiation was measured with a reflection densitometer (X-Rite 310, X-Rite Inc.). The color density measured at a wavelength of 365 nm was evaluated according to the following criteria:

A: more than 0.15 and 0.3 or less

B: more than 0.10 and 0.15 or less, or more than 0.3 and 0.4 or less

C: 0.10 or less, or more than 0.4

[Sensitivity at 1,000 mJ/cm²]

The ultraviolet-sensing sheets were irradiated with ultraviolet radiation from a high-pressure mercury lamp (high-pressure ultraviolet lamp, Ushio Inc.) to a cumulative illuminance of 1,000 mJ/cm². The change in color after the irradiation was measured with a reflection densitometer (X-Rite 310, X-Rite Inc.). The color density measured at a wavelength of 365 nm was evaluated according to the following criteria:

A: more than 0.3 and 0.6 or less

B: more than 0.2 and 0.3 or less, or more than 0.6 and 0.8 or less

C: 0.2 or less, or more than 0.8

[Reusability]

The films for adjusting ultraviolet-sensitivity were irradiated with ultraviolet radiation suing a high-pressure mercury lamp (high-pressure ultraviolet lamp, Ushio Inc.) at a dose of 100 mJ/cm². This procedure was repeated 100 times. Unused films for adjusting ultraviolet-sensitivity and the films for adjusting ultraviolet-sensitivity irradiated 100 times were laminated on ultraviolet-sensing sheets. The ultraviolet-sensing sheets were irradiated with ultraviolet radiation to a dose of 100 mJ/cm². The difference in reflection density was compared.

|  |  | Example 1 | Example 2 | Example 3 | Example 4 | Example 5 | Comparative Example 1 |
|---|---|---|---|---|---|---|---|
| Ultraviolet-Sensing Layer | Photo-oxidant | BMPS | BMPS | BMPS | BMPS | BMPS | BMPS |
|  | ε(350 nm) | 280 | 280 | 280 | 280 | 280 | 280 |
|  | ε(250 nm) | 12730 | 12730 | 12730 | 12730 | 12730 | 12730 |
|  | Photo-oxidants/Leuco dyes (mass rate) | 0.5 | 0.5 | 0.5 | 0.5 | 0.5 | 0.5 |
|  | The amounts of Leuco dyes per surface area of 1 m² of the Ultraviolet-Sensing Layer | 0.3 | 0.3 | 0.3 | 0.3 | 0.3 | 0.3 |
|  | presence or absence of capsules | presence | presence | presence | presence | presence | presence |
| Film for Adjusting Ultraviolet-Sensitivity | Substrate | PET | PET | PEN | — | — | — |
|  | Coating | Pigment | UV absorbers | none | — | — | — |
|  | Pigment particles | Titanium oxide | — | — | — | — | — |
|  | Particle size of pigment (μm) | 0.1 | — | — | — | — | — |
| Layer for Adjusting Ultraviolet-Sensitivity | Coating | none | none | none | Pigment | UV absorbers | none |
|  | Pigment particles | — | — | — | Titanium oxide | — | — |
|  | Particle size of pigment (μm) | — | — | — | 0.1 | — | — |
| Evaluations | Sensitivity at 10 mJ/cm² | A | A | A | A | A | B |
|  | Sensitivity at 100 mJ/cm² | A | A | A | A | A | B |
|  | Sensitivity at 1,000 mJ/cm² | A | A | A | A | A | B |
|  | Reusability | A | A | A | — | — | A |

|  |  | Comparative Example 2 | Comparative Example 3 | Comparative Example 4 | Comparative Example 5 | Comparative Example 6 | Comparative Example 7 |
|---|---|---|---|---|---|---|---|
| Ultraviolet-Sensing Layer | Photo-oxidant | BMPS | BMPS | BMPS | BMPS | BMPS | BMPS |
|  | ε(350 nm) | 280 | 280 | 280 | 280 | 280 | 280 |
|  | ε(250 nm) | 12730 | 12730 | 12730 | 12730 | 12730 | 12730 |
|  | Photo-oxidants/Leuco dyes (mass rate) | 0.5 | 0.5 | 0.1 | 1.5 | 0.5 | 0.5 |
|  | The amounts of Leuco dyes per surface area of 1 m² of the Ultraviolet-Sensing Layer | 0.3 | 0.3 | 0.3 | 0.3 | 0.05 | 1.3 |
|  | presence or absence of capsules | presence | presence | presence | presence | presence | presence |
| Film for Adjusting Ultraviolet-Sensitivity | Substrate | PET | PET | PET | PET | PET | PET |
|  | Coating | Pigment | Black dye | Pigment | Pigment | Pigment | Pigment |
|  | Pigment particles | Calcium carbonate | — | Titanium oxide | Titanium oxide | Titanium oxide | Titanium oxide |
|  | Particle size of pigment (μm) | 3 | — | 0.1 | 0.1 | 0.1 | 0.1 |
| Layer for Adjusting Ultraviolet-Sensitivity | Coating | none | — | none | none | none | none |
|  | Pigment particles | — | — | — | — | — | — |
|  | Particle size of pigment (μm) | — | — | — | — | — | — |
| Evaluations | Sensitivity at 10 mJ/cm² | C | A | A | C | A | C |
|  | Sensitivity at 100 mJ/cm² | C | A | C | C | C | C |
|  | Sensitivity at 1,000 mJ/cm² | C | A | C | C | C | C |
|  | Reusability | A | B | A | A | A | A |

A: 5% or less
B: more than 5% and 10% or less
C: more than 10%

As shown in the table, the ultraviolet-sensing sheet and the ultraviolet-sensing kit according to the present invention are suitable in measurement of ultraviolet irradiance the range from 1 to 1,000 mJ/cm² and also have high reusability.

REFERENCE SIGNS LIST

1 ultraviolet-sensing sheet
10 ultraviolet-sensing layer
11 capsule
12 photo-oxidant
12a activated photo-oxidant
13 leuco dye
20 layer for adjusting ultraviolet-sensitivity
30 support
40 sheet containing an ultraviolet-sensing layer
50 film for adjusting ultraviolet-sensitivity
100 ultraviolet-sensing kit

What is claimed is:

1. An ultraviolet-sensing kit comprising:
   a sheet containing an ultraviolet-sensing layer and a film for adjusting ultraviolet-sensitivity;
   wherein the sheet containing an ultraviolet-sensing layer comprises a support and an ultraviolet-sensing layer in this order;
   the sheet containing an ultraviolet-sensing layer and the film for adjusting ultraviolet-sensitivity are separately provided, are not laminated to each other, and are used together as the kit;
   the ultraviolet-sensing layer comprises capsules containing a photo-oxidant and a leuco dye capable of developing color by the photo-oxidant;
   the mass ratio of the photo-oxidant and the leuco dye is 0.2 to 1.0:1; and the leuco dye is present in an amount of 0.1 to 1.0 g per 1 m² of a surface area of the ultraviolet-sensing layer.

2. The ultraviolet-sensing kit according to claim 1, wherein the film for adjusting ultraviolet-sensitivity has a transmittance at 300 nm of 10% or less and a transmittance at 450 nm of 70% or more.

3. The ultraviolet-sensing kit according to claim 2, wherein the film for adjusting ultraviolet-sensitivity pigment particles.

4. The ultraviolet-sensing kit according to claim 2, wherein the leuco dye is an aminoarylmethane.

5. The ultraviolet-sensing kit according to claim 1, wherein the film for adjusting ultraviolet-sensitivity comprises pigment particles.

6. The ultraviolet-sensing kit according to claim 5, wherein the pigment particles comprise titanium oxide.

7. The ultraviolet-sensing kit according to claim 5, wherein the pigment particles have an average particle size of 0.01 μm or more.

8. The ultraviolet-sensing kit according to claim 5, wherein the pigment particles are present in an amount of 5 g or more per 1 m² of a surface area of the film for adjusting ultraviolet-sensitivity.

9. The ultraviolet-sensing kit according to claim 1, wherein the film for adjusting ultraviolet-sensitivity comprises an ultraviolet absorber.

10. The ultraviolet-sensing kit according to claim 1, wherein the photo-oxidant has a molar absorption coefficient £ of 2,000 or less at a wavelength of 350 nm and a molar absorption coefficient £ of 10,000 or more at a wavelength of 250 nm.

11. The ultraviolet-sensing kit according to claim 1, wherein the capsules are microcapsules.

12. The ultraviolet-sensing kit according to claim 1, wherein the leuco dye is an aminoarylmethane.

13. The ultraviolet-sensing kit according to claim 1, wherein the ultraviolet-sensing sheet has a cumulative illuminance of from 1 to 1,000 mJ/cm² as measured at a wavelength of 365 nm when the ultraviolet-sensing sheet is irradiated with a high-pressure mercury lamp.

14. The ultraviolet-sensing kit according to claim 1, wherein the support is a plastic film.

15. A method for sensing ultraviolet using an ultraviolet-sensing kit according to claim 1, comprising:
  providing a sheet containing an ultraviolet-sensing layer;
  providing a film for adjusting ultraviolet-sensitivity; and
  placing the film for adjusting ultraviolet-sensitivity on or above the sheet containing an ultraviolet-sensing layer.

16. The method according to claim 15, further comprising:
  placing the ultraviolet-sensing kit on a site where ultraviolet radiation is intended to be measured.

17. The method according to claim 16, further comprising:
  measuring change in color after ultraviolet radiation is applied onto the ultraviolet-sensing kit.

18. The method according to claim 17, further comprising:
  providing another sheet containing an ultraviolet-sensing layer; and
  placing the film for adjusting ultraviolet-sensitivity on or above the another sheet containing an ultraviolet-sensing layer so as to reuse the film for adjusting ultraviolet-sensitivity.

19. The ultraviolet-sensing kit according to claim 1, wherein the film for adjusting ultraviolet-sensitivity comprises a transparent support and an ultraviolet-sensitivity adjusting layer.

20. The ultraviolet-sensing kit according to claim 1, wherein the film for adjusting ultraviolet-sensitivity can be reused, by placing the film for adjusting ultraviolet-sensitivity on or above another sheet containing an ultraviolet-sensing layer.

21. The ultraviolet-sensing kit according to claim 1, wherein the layer for adjusting ultraviolet-sensitivity includes an inorganic pigment.

\* \* \* \* \*